ARTICLE SELECTION SYSTEM

Original Filed Aug. 4, 1967 10 Sheets-Sheet 1

INVENTOR.
Robert D. Parry
BY
Wood, Herron & Evans
ATTORNEYS

ARTICLE SELECTION SYSTEM

Original Filed Aug. 4, 1967 10 Sheets-Sheet 2

INVENTOR.
Robert D. Parry
BY
Wood, Herron & Evans
ATTORNEYS

ARTICLE SELECTION SYSTEM

Original Filed Aug. 4, 1967 10 Sheets-Sheet 3

INVENTOR.
Robert D. Parry
BY
Wood, Herron & Evans
ATTORNEYS

ARTICLE SELECTION SYSTEM

Original Filed Aug. 4, 1967 10 Sheets-Sheet 4

INVENTOR.
Robert D. Parry
BY
Wood, Herron and Evans
ATTORNEYS

ARTICLE SELECTION SYSTEM

Original Filed Aug. 4, 1967 10 Sheets-Sheet 5

Robert D. Parry

BY

Wood, Herron and Evans

ATTORNEYS

ARTICLE SELECTION SYSTEM

Original Filed Aug. 4, 1967 10 Sheets-Sheet 6

INVENTOR.
Robert D. Parry
BY
Wood, Herron & Evans
ATTORNEYS

ARTICLE SELECTION SYSTEM

Original Filed Aug. 4, 1967 10 Sheets-Sheet 7

INVENTOR.
Robert D. Parry
BY
Wood, Herron and Evans
ATTORNEYS

ARTICLE SELECTION SYSTEM

Original Filed Aug. 4, 1967

INVENTOR.
Robert D. Parry
BY
Wood, Herron & Evans
ATTORNEYS

ARTICLE SELECTION SYSTEM

Original Filed Aug. 4, 1967 10 Sheets-Sheet 9

INVENTOR.
Robert D. Parry
BY
Wood, Herron & Evans
ATTORNEYS

ARTICLE SELECTION SYSTEM

Original Filed Aug. 4, 1967 10 Sheets-Sheet 10

INVENTOR.
Robert D. Parry
BY
Wood, Herron and Evans
ATTORNEYS

United States Patent Office

Re. 27,762
Reissued Sept. 18, 1973

27,762
ARTICLE SELECTION SYSTEM

Robert D. Parry, deceased, late of Cincinnati, Ohio, by Margaret G. Parry, executrix, Cincinnati, Ohio, assignor to O.K. Partnership and Access Corp., both of Cincinnati, Ohio, fractional part interest to each Original No. 3,478,877, dated Nov. 18, 1969, Ser. No. 661,758, Aug. 4, 1967. Application for reissue Nov. 17, 1971, Ser. No. 199,754
Int. Cl. B07c *5/00, 9/00*
U.S. Cl. 209—80.5 52 Claims

Matter enclosed in heavy brackets [ ] appears in the original patent but forms no part of this reissue specification; matter printed in italics indicates the additions made by reissue.

ABSTRACT OF THE DISCLOSURE

A retrieval system is disclosed for selecting one or more articles having a code-notched sorting edge from a plurality of similar articles stored with their sorting edges *substantailly horizontal and* aligned. The system includes means for selectively engaging sorting bars disposed transversely of the stored articles with the aligned code-notched article edges, separating means for relatively limitedly moving and partially separating, in a *substantial horizontal* direction parallel to their sorting edges, articles notched in conformity with the engaged sorting bars and those not conformingly notched, and lock means for positively locking nonconformingly notched articles to permit further separation of the conformingly and nonconformingly notched articles by continued relative movement in the same direction used to effect partial separation of the articles.

This invention relates to a system for selecting randomly stored articles such as cards, envelopes, folders and the like, having a code-notched edge along at least one margin thereof, and more particularly to improved methods, apparatus and articles of manufacture for selecting, by relatively moving the desired and undesired cards in a *substantially horizontal* direction parallel to their code-notched edges, one or more edge-notched articles from a plurality of similar articles stored with their sorting edges aligned.

In the past, a number of systems have been proposed for selecting edge-notched articles in which the selection is made by relatively displacing the desired and undesired cards in a direction parallel to their coded edges. Typical of *certain of* these are the sorting systems proposed in Whitson, Patents 2,495,491, 2,002,808, 2,379,943, and others. In accordance with these proposals, a plurality of cards are provided each having spaced teeth formed along their bottom edge which are selectively removable for coding purposes. The cards are randomly stored in face-to-face upstanding relation on a slotted platen with their coded edges lowermost. Transversely disposed relative to the coded card edges are a plurality of code or sort bars corresponding in number to, and aligned with, registration notches formed by the spaces between the adjacent code notchable teeth. The code bars, which normally are positioned with their upper edges flush with the platen are selectively elevatable to a set position wherein their upper edges protrude above the platen into their respective registration notches of the cards.

With the prior art proposals, card selection is typically effected in two sequential, yet functionally separate and independent steps. These steps are herein termed the initial or partial separation stage or phase, and the final or further separation stage or phase.

In practice, the first or partial separation stage is accomplished by elevating the code bars in a pattern conforming to the removed teeth of the desired card or cards, and thereafter acting on the cards with a rectilinear force tending to move them in a direction parallel to their coded edges. The desired cards, that is, cards having a removed tooth pattern corresponding to that of the set code bars, shift laterally in the direction of their coded edges a distance equal to the width of a tooth. Such movement is possible because the teeth adjacent the set code bars of the desired card have been removed. The undesired cards, that is, those cards with a nonconforming removed tooth pattern, are not free to move in the direction of their coded edge and, consequently, remain stationary. Hence, partial sparation between the desired and undesired cards results. Once partially separated, the desired cards are further separated from the undesired cards by applying a rotational force to the selected cards. This tilts the selected cards upwardly relative to the unselected cards rendering the desired cards available for inspection or removal.

In accordance with the majority of the prior art proposals, both the rectilinear and rotational forces used in the partial separation and the final separation stages of the sorting cycle, respectively, are produced by means of a movable magnet disposed transversely of the cards in engagement with ferromagnetic chips implanted in the vertical edges thereof. Specifically, the rectilinear force for partial separation is achieved by laterally shifting the magnet in a straight line parallel to the coded card edges for a distance equal to one tooth width. The desired cards, which are free to move, remain engaged with the magnet, becoming displaced from the undesired cards which are restrained by the set code bars. The rotational force necessary for further separation of the desired cards is effected by tilting the magnet upwardly. This tilts the selected cards, which are the only cards still held by the magnet, raising them above the undesired cards to thereby complete the selection process.

The prior art proposals for selecting edge coded cards all have a tendency, during the final separation phase of the card selection cycle, to select undesired cards. Such a tendency is attributable to the frictional drag existing between the cards. This problem is particularly accentuated where it is desired to select a large number of cards, many of which sandwich between them a single card which is not desired. In such a case, the sandwiched card is acted upon by the frictional drag of the two adjacent cards located on each side. Frequently, this drag is of sufficient strength, particularly if the cards are closely packed, to withdraw the sandwiched card from the deck, thus producing an erroneous selection.

*Another type of system has been proposed in the prior art for selecting edge-notched articles in which selection is made by separating the desired and undesired articles in a direction parallel to their coded edges. In accordance with this proposal, suggested in Morse et al. U.S. Patent 3,396,732, information-bearing elements are vertically suspended above a horizontally moving conveyor belt. The belt delivers the elements, which drop under the force of gravity pursuant to a selection process, to an opening in the front of a cabinet which encloses both the belt and the information-bearing elements.*

*The elements of the Morse et al. proposal each have two sorting edges along the vertical sides thereof provided with removable teeth, which teeth represent different letters, numerals, or the like. Spaced below each codable tooth is a notch. These notches and teeth cooperate with vertically spaced horizontal code bars disposed on either side of the element to permit selection. Additionally, located above the group of codable teeth on each vertical edge of the element is a support notch which, when en-*

*gaged by a horizontal support bar transverse to the card, facilitates supporting the card in a vertically suspended position. At a point above the support notches starting a distance less than the width of a codable tooth the edge of the element is removed or relieved to prevent a card from being held by the support bars once it is selected.*

*With the elements supported by engagement of the support bars and support notches, to select an element having a predetermined pattern of removed teeth, the selector bars are set, i.e., advanced inwardly into the notches, in a pattern corresponding to that of the removed tooth pattern of the desired element. The support bars are thereafter retracted, permitting the desired element to drop under the force of gravity a distance equal to the width of a single tooth. The undesired elements having a nonconforming removed tooth pattern are prevented from vertical movement by the set selector bars. Further separation of the desired elements from the undesired elements is effected by re-engaging the support bars with the support notches of the elements to restrain movement of the undesired elements which have remained stationary. At the same time the selector bars are reset to permit additional downward motion of the selected element under the force of gravity. As the selected element continues moving downwardly, it eventually comes to rest on the top of the horizontal conveyor which delivers it to the operator via an opening in the front of the selector housing.*

*Return of an element to storage in the Morse et al. selector is made possible by a second opening in the rear of the selector apparatus housing which is opposite the ends of the selector, support and anti-twist bars. Return is accomplished by, first, pre-aligning the support and anti-twist notches of the element with the support and anti-twist bars, and thereafter sliding the pre-aligned element onto the bars.*

*The Morse et al. retrieval system has certain structural and operational characteristics which detract from its utility in certain applications. For example, because gravity is relied upon for separating the desired elements from the undesired elements, under certain conditions a desired element may fail to be selected. For example, if the stored elements take the form of tab cards of paper stock, and are stored in relatively compacted fashion, the likelihood of failing to retrieve a desired element is quite substantial. This is due to the fact that the frictional force applied to a selected element by adjacent unselected elements, which is on the order of a force of 100 grams, substantially exceeds the downward vertical selection force applied to the card by gravity, which is on the order of 2½ grams.*

*Additionally, in the Morse et al. system, in order to return an element to storage in the selector apparatus it is necessary to pre-align four distinct notches, namely, two support notches and two anti-twist notches, with their respectively associated pairs of support and anti-twist bars. This pre-alignment of notches and bars impedes rapid returning to storage of new or previously retrieved elements. Rapid in-filing of elements is further complicated by the requirement that elements be inserted through an opening in the rear of the housing. In addition to the inability to rapidly in-file elements, in the Morse et al. system it is not possible to insert an element into storage at a point located, for example, in the front or middle of the stored assemblage, but rather only at the rear end thereof opposite the opening in the back of the housing.*

*A further problem with the proposal of Morse et al., wherein the elements when stored are supported by engagement of a pair of adjacent bars with the support notches, is that support is not uniformly distributed along the length of the element, but rather is concentrated at two points. This force concentration tends to cause undue wear of the cards with time.*

*A further problem is inherent in systems of the Morse et al. type, which is attributable to the fact that support of an unselected element during a selection process is transferred from the support bars to the selector bars and back again to the support bars. Specifically, at the beginning of a selection process and prior to setting of the code bars, the elements are supported by engagement of the support bars with the support notches. When so supported, the selector bars are positioned opposite the notches which underlie the codable teeth. To prevent damage to the codable teeth when the code bars are advanced into the notches which underlie the teeth, and to accommodate manufacturing tolerances, the notches are slightly oversized with respect to the code bars, i.e., the vertical dimension of the code notches is larger than the vertical dimension of the code bars. With this relationship of code notch and bar, a clearance necessarily exists between the upper surface of a code bar and the upper edge of the associated notch into which the code bar is set.*

*This clearance disappears, in the course of the selection process as the support bars are retracted, inasmuch as the undesired cards, since no longer supported by the support bars, are free to drop a distance equal to the clearance until restrained by engagement of the set selector bars and the upper edge of the code notches.*

*By virtue of the undesired cards having dropped a distance equal to the clearance, the upper edge of the support notch of the undesired elements is now below the position it occupied at the start of the selection cycle when the element was supported by the upper surface of the support bar. As a consequence, when the support bars are returned to support the unselected elements, and the set selector bars retracted to permit selected elements to drop for further separation movement, the support bars abut, or pean, that portion of the sorting edge located immediately above the upper edge of the support notch. Repeated peaning each time the support bars are reinserted into the support notches following partial separation of a desired element from the undesired elements, in time, damages the elements.*

It has been a principal objective of this invention to provide a system for selecting randomly stored edge coded cards which overcomes the problem occasioned by the frictional drag between cards which frequently has resulted in the selection of undesired cards during the final separation phase of the sorting cycle [.], *which facilitates rapid infiling of cards at any point in the card assemblage, and which minimizes unnecessary card wear.*

This objective has been accomplished in accordance with certain of the principles of this invention by utilizing a very unobvious and unique *combination of features including disposition of the cards with the sorting edges substantially horizontal, positive locking of undesired cards after the desired cards have been initially separated therefrom, and use of magnetic force to initially and finally separate the desired cards from the undesired cards in a direction parallel to the sorting edge.*

*The* locking concept [which] centers on positively restraining the undesired cards during the final separation stage of the card sorting cycle, thereby preventing undesired cards from being selected as a consequence of the frictional drag exerted by adjacent cards which are selected.

In one preferred form of this invention the locking concept involves a two-fold approach which includes, firstly, providing the sorting apparatus with a barrier and the cards with a cooperating lock notch positioned along the coded sorting edge, and, secondly, effecting final separation of the cards by application of a rectilinear force to the cards directed along their coded sorting edges. The lock notch and cooperating barrier are located such that, in the course of the initial separation phase of the sorting cycle when the desired cards are relatively laterally shifted the width of a tooth, the lock notches of undesired cards become exposed, that is, they are in transverse registry with a removed portion of the trailing edges of the selected cards, leaving the lock notches of only the undesired cards aligned with the barrier. With the lock notches of only the undesired cards exposed and aligned with the barrier, positive restraint of the undesired cards during the final card separating phase of the sorting cycle can be effected by interposing the barrier into the exposed lock notches of the undesired cards prior to initiation of the rectilinear sorting edge direct force characteristic of the final separation stage. Once interposed, the barrier positively locks the undesired cards against inadvertent selection occasioned by the frictional effects of adjacent cards, making it possible to select cards even under the worst frictional conditions, namely, those frictional conditions which arise when the selection of every other card in the deck is desired.

Thus, the provision of a lock notch and cooperating barrier coupled with a rectilinear final stage separating force has produced a sorting system which positively insures against the selection of undesired cards. It is noted that such a result is produced without resort to complex sorting equipment. On the contrary, the positive restraint of undesired cards present in this invention, which insures against erroneous selections, is provided by the addition of structure of extreme simplicity, namely, a card notch and barrier.

*The horizontal sorting edge feature involves disposing cards vertically with their sorting edges substantially horizontal, and in a preferred form lowermost. By virtue of disposing the sorting edges horizontally, support of the cards during storage is distributed along substantially the entire length of the card, reducing undue support force concentrations and the attendant unnecessary wear. Additionally, with the card sorting edges horizontally disposed and supported along the bottom edges thereof, in-filing of cards, and at any point of the deck, can be rapidly accomplished by merely inserting the cards into the deck from the top. Thus, pre-alignment of card notches with bars of one type or another prior to card insertion, and the attendant time-consuming nature of such pre-alignment, is unnecessary. Additionally, since the cards are supported along the entire edge thereof rather than by engagement of support bars with support notches, as is the case with vertically disposed cards, there is no card damage upon reinsertion of the support bars into the support notches of cards which have dropped during the initial separation phase due to clearance between the selector bars and their associated notches. Finally, the mechanism required to support the card is simplified to the extent that a stationary horizontal support surface engageable with the bottom edges of the card need only be provided. It is unnecessary to provide a mechanism for shifting support bars both before and after the initial separation phase of the card selection cycle.*

*The magnetic force feature comprehends the utilization of a magnet, preferably movable, to apply a magnetic force to the cards in a direction parallel to their sorting edges during the initial and final separation phases of the card selection cycle. By virtue of utilizing magnetic force to separate the desired cards from the undesired cards, the cards can be stored compactly, yet selection of a desired card is not prevented, as is commonplace in gravity-type systems, by the frictional forces applied to a desired card by adjacent undesired cards.*

A further advantage of this invention, which inheres in the rectilinear relative movement during the final stage, in addition to contributing to the positive restraint of undesired cards, is the simplification of the sorting apparatus mechanism used to relatively move the cards. In the system of this invention, relative card movement in both the initial and final stages is rectilinear. Consequently, the same mechanism used to shift the cards during the final stage of the sorting cycle can be used during the initial stage. Thus, complex mechanisms for producing different kinds of relative card motion are unnecessary.

Another problem quite common in prior art sorting systems of the general type to which this invention is directed is their tendency to produce erroneous card selections which result when the coded or sorting edge of the card is not in proper operational relationship with respect to the code bars during one or more phases of the sorting cycle. It is a known phenomenon that cards acquire like polarity static electrical charges through use and handling. Such charges, when the cards are packed together in sorting apparatus, cause forces of mutual repulsion to develop. These repulsion forces manifest themselves by misaligning the cards, which in turn cause a certain percentage of the cards to pull away from an operative sorting position in which their coded edges contact the platen. With the coded card edges so spaced from the platen, the sorting bars do not properly cooperate with the codeable teeth, and erroneous card selections result.

It has been an additional and principal objective of this invention to provide a card selection system in which the likelihood of erreneous card selections, occasioned by static charged induced separation of the card sorting edge from operative relation to the code bars, is eliminated entirely or at least materially reduced. In accordance with certain further principles of this invention this objective has been accomplished by incorporating into the card and the sorting apparatus certain unique camming features which cooperate in a very unobvious manner to maintain the sorting edges of the card in operative relation with the code bars throughout the critical phases of the sorting cycle. More specifically, the camming arrangement responsible for avoiding erroneous card selections includes the provision, in at least one of the edges of the card normal to the coded sorting edge, of a cam follower notch which actively cooperates with a cam member provided in the sorting apparatus to postively urge the card sorting edge into operative relation to the sorting bars during the critical phases of the sorting cycle, thereby preventing erroneous sorts occasioned by card mispositioning. Thus, by merely notching the card and providing a cooperating cam, both changes minor in structure but major in consequence, a card sorting system is provided which overcomes the static charge problem.

In card sorting systems in which magnetic forces are used to laterally shift the cards in the direction of their coded sorting edge, a problem has frequently arisen involving detachment of the ferromagnetic chip from the card occasioned by constant handling and cycling of the card in the sorting apparatus. Typically, the ferromagnetic chip is rectangular in shape and is fitted in a similarly shaped notch formed in the marginal portion of the card to which it is bonded. It has been found that the chip, through constant wear and usage, has a tendency to flex or bend along those edges which mate with the edges of the notch formed in the card, eventually becoming separated from the card. When this occurs the card must be replaced, introducing an additional cost factor into the card sorting operation.

It has been a further and equally important objective of this invention to provide magnetically responsive cards in which the ferromagnetic chip is not likely to prematurely separate from the card during normal usage. This objective has been accomplished in a preferred form of this invention by providing a card with a ferromagnetic chip having a sinuously configured edge portion which mates with a similarly configured notch formed in the margin of the card. This chip and notch configuration provides a joint between the chip and card which is characterized by the absence of a straight cleavage line. Such a joint offers a high degree of resistance to bending and, consequently, results in the production of a card having a markedly extended useful life. Thus, by merely changing the chip and notch configuration, again changes minor in structure but major in consequence, a card is produced having qualities far superior to those previously known.

It has been another objective of this invention to provide improved sorting apparatus characterized by structural as well as operational simplicity. This objective has been achieved in one preferred form of this invention by utilizing a novel code bar design which enables the code bars to be elevated into the registration notches of adjacent cards by applying a direct force to the bars in a direction perpendicular to their elevation direction. This novel design, more specifically, contemplates providing a code bar having a cam follower surface along its bottom edge which rides up and down on a stationary cam into and out of engagement with the card notch, respectively, when urged in opposite direction parallel to the code bar. Such an arrangement results in a relatively compact code bar mechanism which can be raised or lowered with a minimum of actuating hardware.

A further design feature incorporated into the sorting apparatus of this invention for simplifying the structure and operation thereof, which is useful where magnetic forces are used to separate the cards, is a unique drive mechanism for moving the magnet relative to the cards. This drive mechanism overcomes two distinct problems. The first problem involves generating the large force necessary to overcome the magnetic attraction between the magnet and the unselected cards during the initial phase of the sorting cycle. The second problem relates to applying a balanced force to the magnet to prevent an unbalanced torque from developing on the magnet should the unselected cards be unevenly distributed in the sorting apparatus.

Considering the first problem, it has been found that a typical installation involves the storage of approximately 2,000 cards. However, in any given sorting cycle, usually only a few cards are selected. This means that during the initial phase of the sorting cycle the initial magnetic attraction between the unselected cards, which are the vast majority, and the magnet must be broken otherwise they will be selected. It has been found that breaking this magnetic attraction requires a force on the order of 200 pounds. Thus, the magnet drive mechanism must be able to develop a force of 200 pounds if it is to properly select the desired cards.

The second problem arises when the unselected cards are stored primarily on one side or the other of the sorting apparatus. When such is the case, a larger magnetic attractive force between the unselected cards and the magnet exists on one end of the magnet than on the other. This force unbalance gives rise to the development of unbalanced torque on the magnet. Such a torque has a tendency to cause binding to occur between the stationary and movable members of the magnet drive assembly, an obviously undesirable result.

The above problems have both been overcome in a preferred embodiment of this invention by utilizing a pair of identically configured bell cranks each having one of their arms cooperating with opposite portions of a centrally positioned cam disc and the other of their arms in driving relation to spaced points on the magnet. With such a drive arrangement, equal forces of relatively high magnitude can be developed by a relatively low torque cam disc and applied to the magnet, via the symmetrically positioned bell cranks, in a manner which avoids unbalanced torques and consequent undesirable binding between the moving and stationary parts of the magnet drive mechanism.

A further and very important objective of this invention has been to provide an article selecting system which, in addition to achieving the foregoing objectives and having the advantages noted earlier, is extremely compact, highly reliable, and very economical to manufacture, operate and maintain.

Other objectives and advantages of this invention will be more readily apparent from a detailed description of the invention taken in conjunction with the accompanying drawings in which.

CARD

Figure 2:
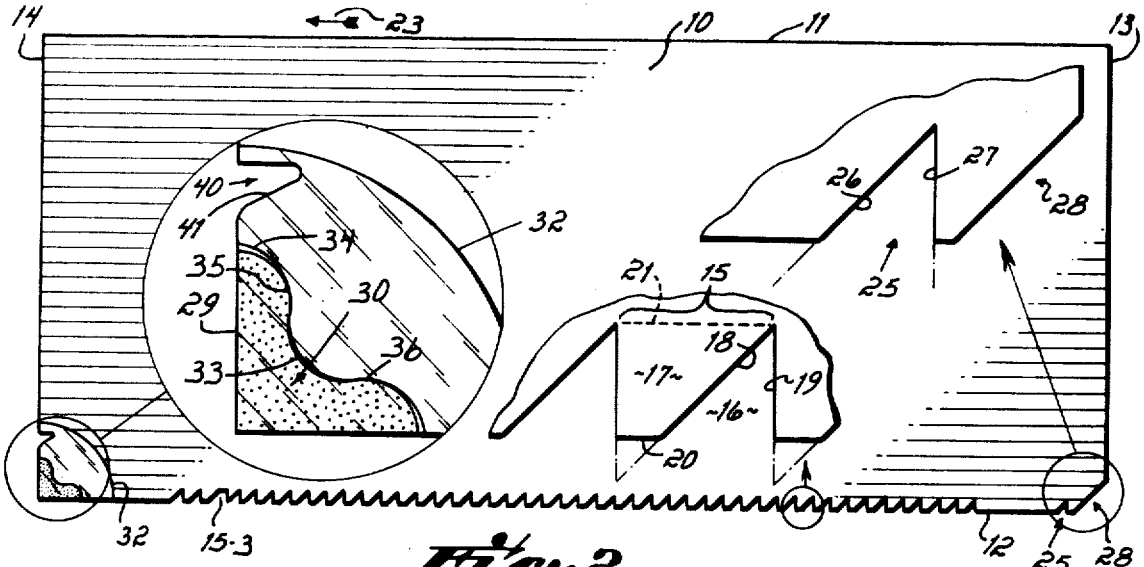
FIGURE 2 is an elevational view of a preferred embodiment of an edge coded card suitable for use in practicing the card selection system of this invention, showing details of the ferromagnetic chip and positioning notch, the code sites including the registration notches and selectively removable teeth, and the lock notch.

A preferred embodiment of a card embodying certain of the concepts of this invention and suitable for practicing the edge-sorting system of this invention is illustrated in FIGURE 2. Referring to this figure, the card 10 is seen to have a substantially rectangular shape defined by an upper edge 11, a lower or sorting edge 12, a right-hand edge 13, and a left-hand edge 14. The sorting edge 12 includes a plurality of code sites 15. The code sites 15 each include a registration notch 16 and a selectively removable or notchable tooth 17. The registration notch 16 is in the form of a right triangle defined by a rightwardly sloping edge 18 and a vertical edge 19. The tooth 17 is in the form of a right trapezoid defined by the vertical and rightwardly sloping edges 19 and 18, a bottom edge 20, and an upper edge 21, indicated by the dotted line, connecting the apexes of adjacent right triangular registration notches 16.

For reasons to become apparent hereafter, the registration notch 16 of each code site 15 should be positioned relative to its associated tooth 17 such that it lies between the tooth 17 and the leading edge of the card. With the notch 16 so positioned, cards having notch patterns conforming to the pattern of actuated code bars can be shifted in the direction of the sorting edge 12 relative to the cards not having notch patterns conforming to the pattern of actuated code bars to effect partial separation during the sorting process.

For the purpose of locating the registration notch 16 relative to the tooth 17 the leading edge of the card 10 is determined with reference to the direction in which a selected card is moved relative to the code bars 53 to be described in the course of the selection process. In this case the leading edge of the card is the left-hand edge 14, the card being moved relative to the code bars 53 in the direction of arrow 23 during the course of the card selection process. Thus, with the card 10 being moved leftwardly relative to the code bars to be described, that is, in the direction of arrow 23, during the card selection process, the registration notch 16 of the code site 15 is positioned between the leading edge 14 and the tooth 17, that is, to the left of the associated tooth 17.

The code site 15 is susceptible of being encoded in binary. Specifically, the code site 15 is susceptible of representing one value when the tooth 17 is not removed and another value when the tooth 17 is removed. Thus, depending on whether or not the tooth 17 is removed from a particular code site 15, the code site is encoded to represent one or the other of two values or conditions.

The card 10 further includes a lock member or portion for enabling the card to become locked and its motion parallel to the sorting edge 12 controlled or restrained. In one preferred form, the lock member or portion takes the form of a locking notch 25. The locking notch 25 is configured or shaped as a right triangle defined by a rightwardly sloping edge 26 and a vertical edge 27. Cooperating with the notch 25 in a manner to be described later is a removed portion 28 of the sorting edge 12. The locking notch 25 and removed portion 28, while preferably located along the sorting edge 12 may, if desired, be located along the upper edge 11.

Regardless of whether the locking notch and removed portions 25 and 28, respectively, are located along the sorting edge 12 or the upper edge 11, certain critical requirements must be satisfied. Specifically, the locking notch 25 must be positioned between the leading edge of the cards defined earlier, which in this case is left-hand edge 14, and the removed portion 28. In addition, the spacings between the lock notch 25 and the removed portion 28 must not exceed the width of a tooth 17 measured in the direction of the sorting edge. The preceding criteria permit the lock notches 25 of unselected cards having nonconforming notch patterns, that is, notch patterns matching the pattern of the actuated code bars to become exposed when the selected cards having conforming notch patterns, that is, notch patterns matching the pattern of actuated code bars, are shifted in the direction of the sorting edge to effect partial or initial separation of the desired cards and the undesired cards. As used herein, the term "initial separation" or "partial separation" means the relative displacement between the selected and unselected cards in a direction parallel to the sorting edge and for a distance equal to the width of one tooth which occurs during the initial phase of the card selection process. By the term "exposed" is meant that after the initial separation the lock notch 25 of an unselected card is transverse registry with the removed portion 28 of the selected card so that a barrier or lock bar 54 to be described can enter and engage the lock notch of unselected cards without engaging the selected cards, thereby permitting further separation of the selected and unselected cards by continued relative movement between the selected and unselecting cards in a direction parallel to the sorting edge. By the term "further separation" is meant the relative displacement between the selected cards and the unselected cards in the direction of the sorting edge which occurs during the card selection process subsequent to the initial separation or partial separation defined above.

Finally, the width of the removed portion 28 measured in the direction of the sorting edge 12, if it does not extend to the trailing or right-hand edge 13 of the card, must be equal to the relative distance it is desired to move a selected card subsequent to the initial selection or separation phase of a retrieval cycle. This permits further separation of selected cards while simultaneously positively locking against movement those cards which have not been selected during the initial separation phase, thereby completing the sorting cycle. By the term "sorting cycle" as used herein is meant both the initial separation or partial separation phase of the card selection operation and the further separation phase of the card selection process.

The card 10 further includes a card separating portion for enabling the card 10 to be moved in a direction parallel to its sorting edge 12. In one preferred form the card separating portion is a magnetically attractable portion 30 formed in the left-hand or leading edge 14 of the card 10 Preferably, the magnetically attractable portion 30 is a ferromagnetic chip positioned in a notch formed by removing a correspondingly shaped portion of the corner of the card defined by the leading edge 14 and the sorting edge 12. The chip 30 is held in place by a sheet of plastic 32, such as Mylar, which overlies both the chip 30 and a limited marginal portion of the card surrounding the ferromagnetic chip, and is adhered thereto by a thin film of polyethylene.

The ferromagnetic chip 30 in accordance with certain principles of this invention has a scalloped diagonal edge 33 which makes point contact with the adjacent edge 34 of the card 10 at two points 35 and 36, the remaining portions of the scalloped edge 33 being slightly spaced from the adjacent card edge 34 to permit adhesive, such as polyethylene, to flow therebetween to effect an efficient bond between the ferromagnetic chip 30 and the adjacent edge 34 of the card. The provision of two points 35 and 36 at which the scalloped diagonal edge 33 of the ferromagnetic chip 30 contacts the associated diagonal edge 34 of the card 10 functions to positively locate and position the ferromagnetic chip 30 with respect to the card 10.

The sinuous configuration of the chip edge 33 which makes contact with the approximately like-shaped card edge 34 provides a very novel and unobvious result. Specifically, the sinuous edge configuration, by eliminating a straight cleavage line at the joint between the card stock and chip, materially reduces the likelihood of the chip and card bending at the joint and ultimately becoming separated from each other. It has been found that a straight line joint between the chip 30 and card stock produces a card 10 which is much more susceptible to bending at the joint between the adjacent chip and card stock edges, and which therefore is much more likely to fail at the joint, and ultimately separating the chip from card stock. The sinuous diagonal edge configuration of the preferred chip of this invention overcomes this problem.

Figure 23:
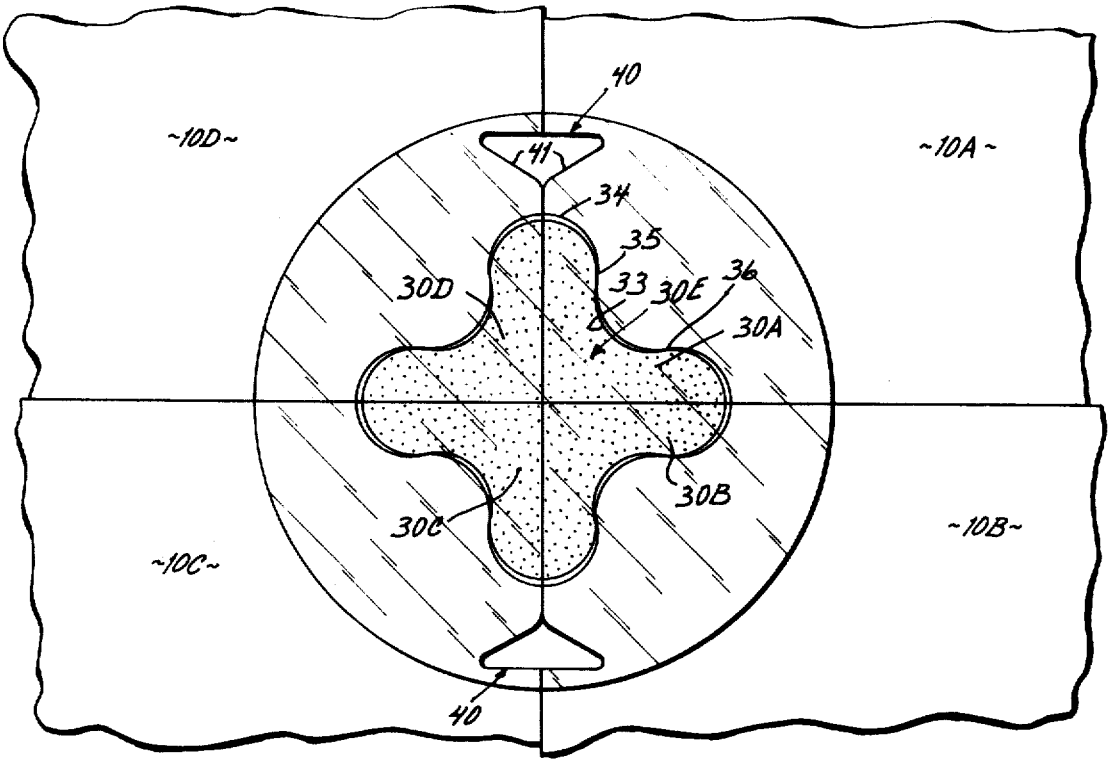
FIGURE 23 is an elevational view of the junction of the ferromagnetic chip bearing corners of four cards as they appear in one phase of a preferred card manufacturing operation.

The shaping of the ferromagnetic chip 30 in the general form of a quadrant of a circle and the positioning of the chip 30 at the corner of the card 10 facilitates efficient manufacture. Specifically, it facilitates the chips 30A–30D of four cards 10A–10D to be formed from a single chip 30E four times the size of the chip 30 as shown in FIGURE 23. This is accomplished by placing the enlarged chip 30E at the junction of the similar corners of four cards yet uncut from a single sheet of material. With the enlarged chip 30E so located at the junction, the chips 30A–30D can be formed by cutting the sheet having the four cards 10A–10D thereon along mutually perpendicular lines coinciding with the leading edges 14 and the sorting edges 12 of the four cards.

The card 10 is further provided with a positioning notch 40 formed in the leading edge 14. The positioning notch 40 has a downwardly sloping lower edge 41 and serves to cam the card 10 downwardly, urging the sorting edge 12 against a card support 51 when a horizontally disposed similarly configured positioning bar is urged into the notch, in a manner to be described more fully hereafter. The positioning notch 40, in cooperation with the positioning bar to be described, insures that the card 10 is properly oriented prior to the sorting operation, thereby preventing sorting errors due to improperly positioned cards.

STORING AND SORTING APPARATUS

Figure 1:
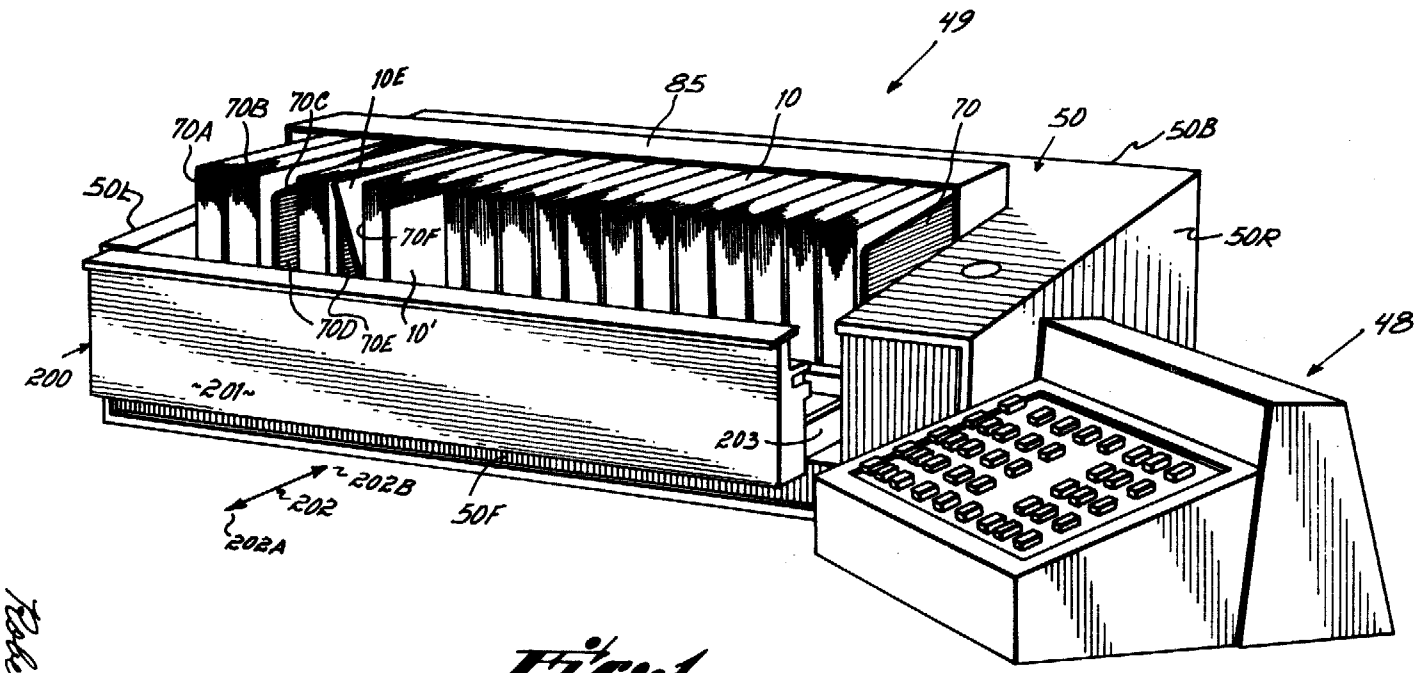
FIGURE 1 is a schematic view in perspective of the card selection system of this invention including a preferred embodiment of the card storing and sorting apparatus and the keyboard control console.
Figure 10:
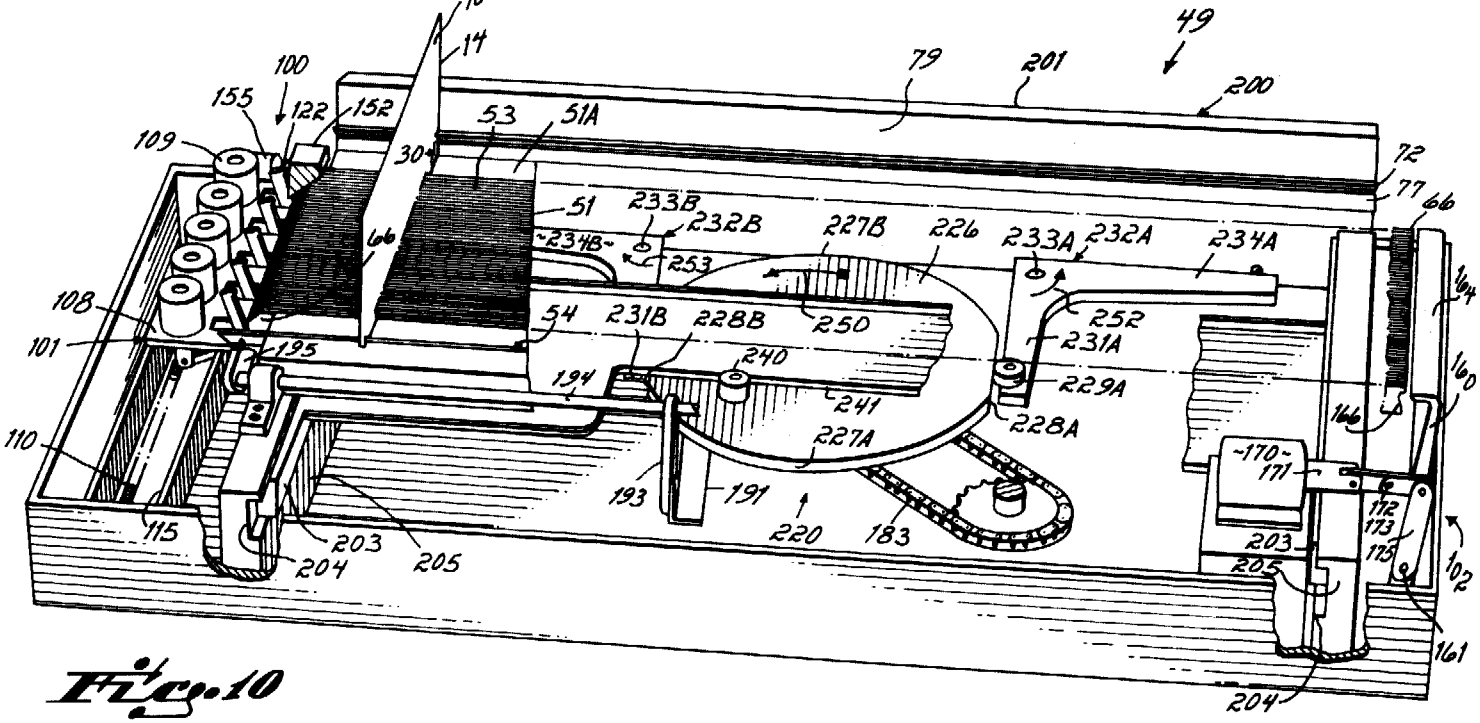
FIGURE 10 is a schematic view in perspective of the preferred embodiment of the card storing and sorting apparatus partially cut away to show the general organization of its various operating components.

A preferred form of apparatus suitable for randomly storing and sorting the randomly stored cards 10 of this invention is depicted in general in FIGURES 1 and 10. Referring to FIGURES 1 and 10, this apparatus is seen to include a keyboard control console 48 and a cabinet 50. The cabinet 50 has a right side panel 50R, a left side panel 50L, a back panel 50B, and a front panel 50F. The front panel 50F has a removed portion adapted to receive a panel 201 of a carrier 200 horizontally movable in the direction of arrow 202 in a manner to be described.

Figure 21:
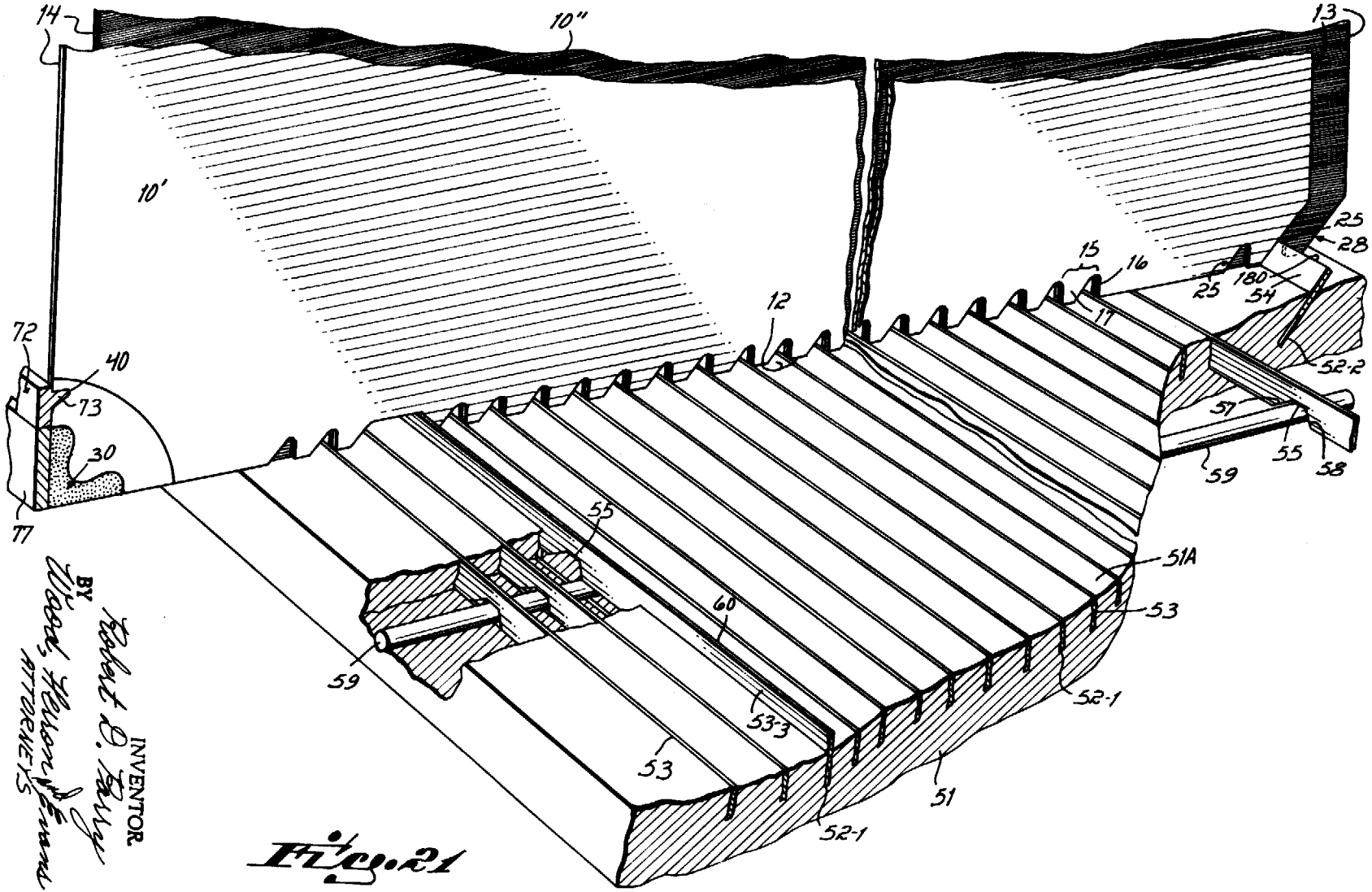
FIGURE 21 is a perspective view of the card support partially cut away to show the relationship of the code and lock bars relative to a partially selected card and an unselected card.

Within the cabinet 50 is the horizontally disposed card support 51 adapted to support in upstanding relation between dividers 70 and with their sorting edges 12 aligned, a plurality of cards 10 habitually stored in random fashion. The card support 51, as shown best in FIGURE 21, preferably is in the form of a flat plate having a plurality of parallel, partially through or blind slots 52 disposed in a direction transverse to the sorting edges 12 of the cards 10. The blind slots 52 correspond in number and position to the combined number of registration notches 16 and locking notch 25 formed in the sorting edges 12 of the cards 10, there being a blind slot 52 opposite each of the registration notches 16 and the locking notch 25 of a card 10 properly positioned on the support 51 prior to sorting. The slots 52–1 opposite the registration notches 16 are normal to the plane of the top 51A of the support 51, while the slot 52–2 opposite the locking notch 25 is angled rightwardly as viewed in FIGURE 21 for reasons to be described.

A code bar or sorting bar 53 common to the sorting edges 12 of all stored cards 10 is slideably disposed in each blind slot 52–1 opposite a registration notch 16 of a properly stored card 10. A locking bar 54 is disposed in the blind slot 52–2 located opposite the locking notch 25 of a properly positioned card 10.

Figure 16:
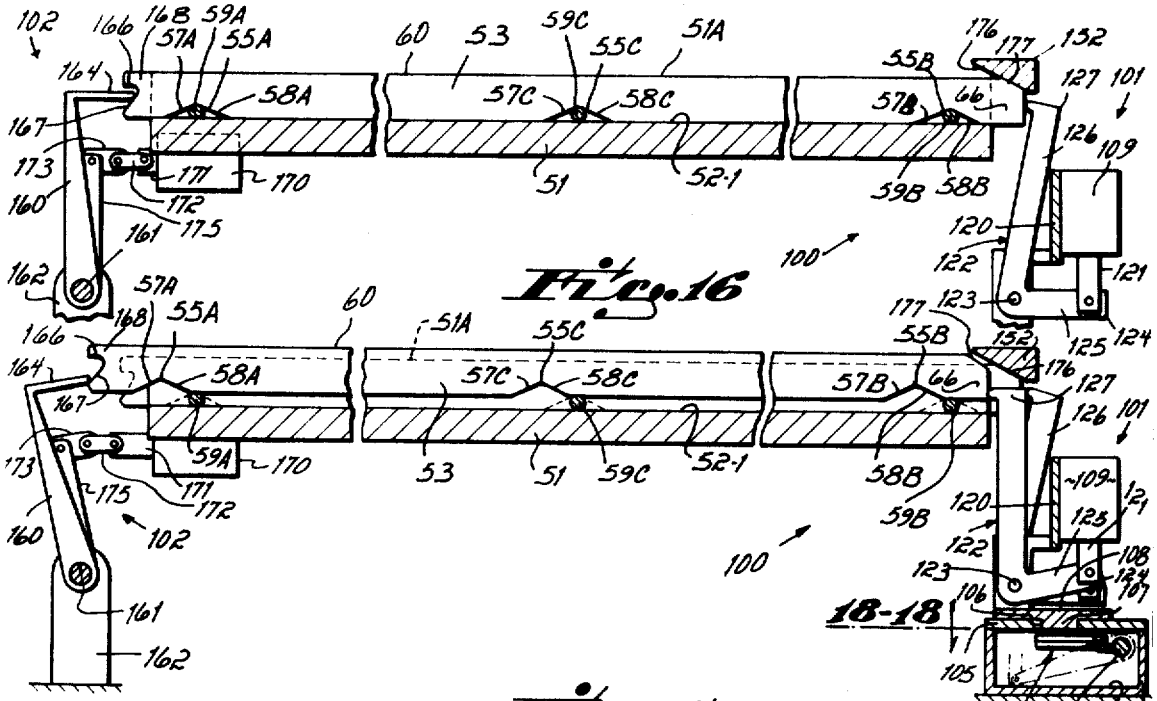
FIGURES 16 and 17 are schematic front elevational views of a preferred form of code bar, code bar actuating mechanism, and code bar resetting mechanism depicting their relative relationships when the code bar is reset and set, respectively.
Figure 17:
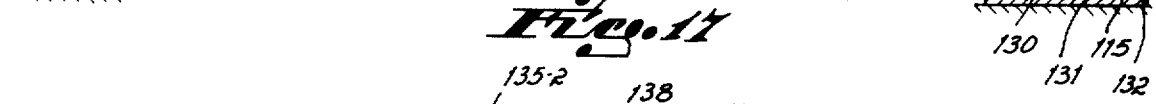

Referring to FIGURES 16 and 17, a preferred form of coding bar or sorting bar 53 is shown. The coding bar 53 is provided with end notches 55A and 55B positioned adjacent each end and a central notch 55C positioned intermediate the ends. The notches 55A, 55B and 55C are in the form of an inverted "V," and have downwardly and outwardly sloping portions 57A, 57B and 57C and downwardly and inwardly sloping portions 58A, 58B and 58C. The code bar 53 has two stable vertical positions, namely, an upper position depicted in FIGURE 17 and a lower position depicted in FIGURE 16. In the upper position, the upper edge 60 of the code bar 53 extends above the upper surface 51A of the card support 51 an amount equal to slightly less than the depth of the registration notch 16 defined by the length of the notch edge 19. In the lower position, the upper edge 60 of the code bar 53 is flush with the top surface 51A of the card support 51.

Movement of the code bars 53 between their respective lower and upper positions depicted in FIGURES 16 and 17, respectively is effected by a code bar actuator generally indicated by the reference numeral 100. The code bar actuator 100 includes a set of horizontally spaced stationary rods 59A, 59B and 59C disposed transverse of, and common to, each of the code bars 53. The rods 59 function to cam upwardly the code bars 53 when the latter are laterally shifted, thereby positioning the code bars in their upper stable position depicted in FIGURE 17. To effect lateral shifting of the code bars for upward code bar 53 camming motion, the code bar actuator 100 further is provided with a carriage-mounted solenoid assembly 101 which selectively laterally shifts the code bars 53. To reset the code bars to the lower position shown in FIGURE 16, a code bar reset mechanism 102 is provided to laterally shift the code bars 53 in the direction opposite to the lateral shifting produced by the carriage-mounted solenoid assembly 101.

Figure 20:
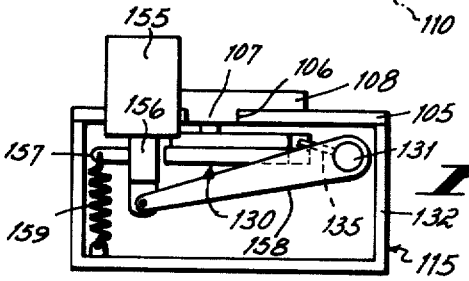
FIGURE 20 is a schematic front elevational view of the carriage stepping mechanism.

The carriage-mounted solenoid assembly 101 includes a carriage 108, as shown in FIGURES 10 and 20. The carriage 108 is slideably mounted on a horizontally disposed guide plate 105 fixed to the top of a U-shaped support 115. The guide plate 105 is provided with a longitudinal guide slot 106 which receives a guide lug 107 depending from the bottom of the carriage 108. The carriage 108 is spring biased toward the back panel 50B of the housing 50 by a spring 110 connected between the housing back panel 50B and the carriage 108.

Fixedly mounted on the carriage 108 is a set of solenoids 109 under control of the console 48. The number and spacing of the solenoids 109 can vary depending on the number and size of code fields into which the plurality of code sites 15 of the sorting edge 12 are divided. If, for example, the card 10 is provided with forty-five code sites 15 divided into five code fields of nine code sites each, the number and spacing of the solenoids is such that it is possible, by intermittently advancing the carriage 108 in nine increments of one code site each, to encode all of the code sites positioned along the sorting edge. Thus, the number of solenoids corresponds to the number of fields, in this case, five, and the spacing of the solenoids corresponds to the width of a field, in this case, the width of nine code sites.

Each of the solenoids 109, as shown in FIGURES 16 and 17, is mounted on a bracket 120 which, in turn, is mounted on the carriage 108. The solenoid mounting is such that the solenoid armature 121 is vertically disposed. Associated with the armatures 121 are bell cranks 122 pivotally mounted about pins 123 fixed to the bracket 120. The bell cranks 122 have their ends 124 of their lower legs 125 pinned to the armatures 121. The upper legs 126 of bell cranks 122 are angled and dimensioned such that their free ends 127 are positioned to the right of the ends 66 of the code bars 53 when the code bars are in their normal lower positions. In addition, the upper legs 126 of the bell cranks 122 are dimensioned and angled with respect to the lower legs 125 such that when the solenoids 109 are energized and their armatures 121 retracted to their upper positions shown in FIGURE 17, the free ends 127 of the legs 122 shift leftwardly a distance sufficient to drive the code bars 53 leftwardly to disengage the notches 55A, 55B and 55C from their associated transverse rods 59A, 59B and 59C, respectively.

Movement of a code bar 53 to its upper position shown in FIGURE 17 with the edge 60 projecting above the top surface 51A of the card support 51 is produced by actuating the appropriate keys of the control console 48 to effect energization of the solenoid 109 and retraction of its armature 129, which in turn produces clockwise pivotal motion of bell crank 122. The pivotal bell crank motion is effective to cause the upper free end 127 of the bell crank to abut the right-hand end 66 of the code bar 53 moving it leftwardly from the position shown in FIGURE 16 to the position shown in FIGURE 17. Leftward movement of the bar 52 causes the notch sides 58A, 58B and 58C to ride up on the top of the cam rods 58A, 59B and 59C, respectively, raising the code bars upwardly from the position shown in FIGURE 16 to the position shown in FIGURE 17.

To provide intermittent stepping motion for the carriage 108, a stepping mechanism 130 is provided as shown in FIGURES 10, and 18–20. The stepping mechanism 130 includes a rod 131 rotatably supported in journals 133 and 134 which are fixed to the outer vertical side 132 of the U-shaped member 115. The rod 131 has formed thereon a plurality of normally horizontally disposed teeth 135 corresponding in number and spacing to the notch sites 15 contained in a code field. Cooperating with the teeth 135 are a pair of relatively movable teeth 137 and 138 formed on plates 139 and 140, respectively. The plate 139 is pivotally mounted parallel to the underneath surface of the carriage 108 by a pin 142 secured to the carriage. The plate 140 is limitedly slideably mounted on the plate 139 by a pair of spaced pins 143 secured to the plate 139 and projecting through slots 144 formed in the plate 140. A spring 145 secured at its one end to a pin 146 fixed to the carriage 108 and at its other end to the plate 140 directly biases the plate 140 leftwardly and, via pins 143, indirectly biases the plate 139 in a clockwise direction about carriage-mounted pivot pin 142. The direct biasing of the plate 140 by the spring 145 is limited by the engegement of the pins 143 with the right-hand end of the slots 144. The indirect biasing of the plate 139 by the spring 145 is limited by the engagement of an integral extension 148 formed on the plate 139 and a pin 150 secured to the carriage 108.

Figure 18:
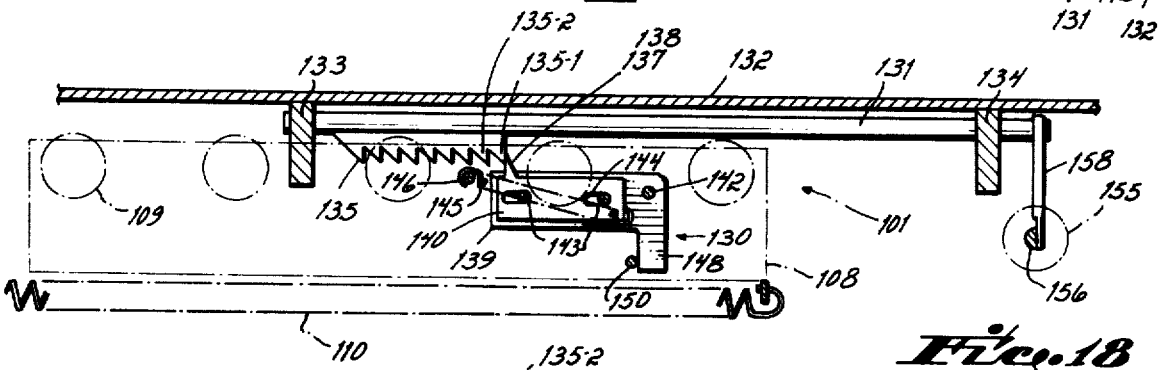
FIGURES 18 and 19 are top plan views of the carriage stepping mechanism showing the relationship of its various components at rest and during a stepping cycle, respectively.

As shown in FIGURE 18, in the normal carriage position, that is, when the carriage is at rest in contrast to being engaged in stepping motion, the tooth 137 formed on the plate 139 is engaged with one of the teeth 135 and maintained in this position by the spring 110 biasing the carriage 108 leftwardly. In such a condition, a clockwise moment is applied to the plate 139 by the tooth 135 biasing the plate clockwise about the pin 142 to the position shown in FIGURE 18 where the integral plate extension 148 abuts the fixed stop pin 150. In addition, in this condition, tooth 138 formed on the plate 140 is vertically displaced above the tooth 137 as shown in FIGURE 17 and forward of the tooth 135 as viewed in FIGURE 18. With the tooth 138 so located relative to the tooth 135 with which the tooth 137 is engaged, the plate 140 is free to move leftwardly under the action of spring 145 to its limit of travel determined by the engagement of pins 143 and the right-hand ends of the slots 144.

To advance the carriage 108 one increment, the rod 131 is rotated clockwise from the position shown in FIGURE 17 to the position shown in FIGURE 20. Rotation of rod 131 in this direction and to this extent disengages the tooth 135–1 and the tooth 137 while simultaneously engaging the tooth 135–1 with the tooth 138. With the tooth 137 disengaged, the carriage 108 is free to move leftwardly under the action of the spring 110. However, such leftward motion of the carriage 108 is limited by the lost motion of plate 140 determined by the slots 144 and cooperating pins 143, which lost motion is slightly less than the spacing of the teeth 135.

Figure 19:
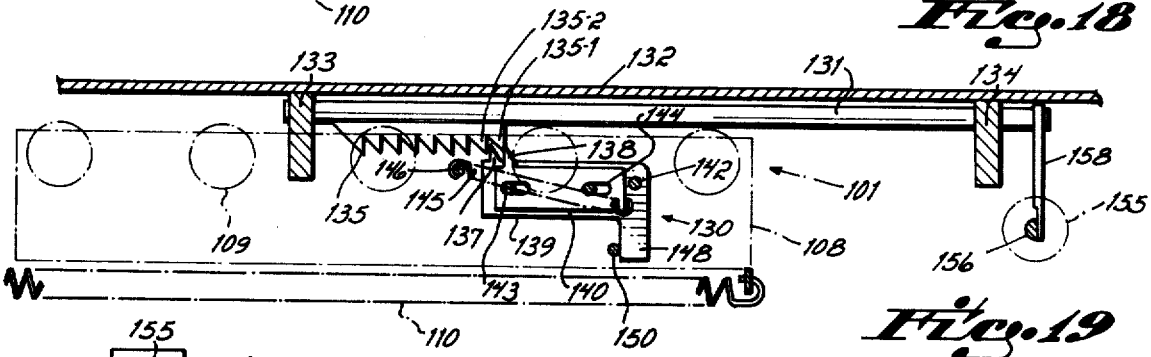

When the carriage 108 has advanced leftwardly from the position shown in FIGURE 18 to the position shown in FIGURE 19, the rod 131 is rotated counterclockwise returning the teeth 135 to the position shown in FIGURE 17 from that shown in FIGURE 20. Rotation of the rod 131 and consequent lowering of the teeth 135, disengages the tooth 138 and 135–1 while simultaneously aligning the teeth 137 and 135–2, as shown in FIGURE 19. With the tooth 138 disengaged, the plate 140 returns to the position of FIGURE 18 under the action of the spring 145. In addition, the tooth 137 engages the tooth 135–2 with which it has become aligned while the carriage 108 moves leftwardly under the action of spring 110 to eliminate the clearance between aligned teeth 137 and 135-2, thereby completing one cycle of the stepping motion which increments the carriage the width of one code site.

To rotate the rod 131 and, hence, the tooth 135, a stationarily mounted solenoid 155 under control of the console 48 is provided. The solenoid 155 has a depending and vertically reciprocable armature 156 which is normally positioned in its lowermost position, depicted in phantom lines in FIGURE 17, by a bias spring 159 connected between an extension 157 integral with the armature and the bottom of the U-shaped member 115. Transforming the reciprocable motion of the vertical rod of the armature 156 to rotation of the shaft 131 is a link 158 which is pinned at one end to the armature 156 and at the other fixedly secured to the rod 131.

When the solenoid 155 is energized by actuation of the appropriate key of the control console 48, the armature 156 retracts moving upwardly overcoming the bias action of the spring 159. This vertical motion pivots the link 158 in a clockwise direction from the position shown in FIGURE 17 to the position shown in FIGURE 20, in turn rotating the shaft 131 in a counterclockwise direction to raise the teeth 135 from the position shown in FIGURE 17 to the position shown in FIGURE 20. When the solenoid 155 is de-energized, the armature 156 returns from its upper position shown in FIGURE 20 to the lower position shown in FIGURE 17 completing the cycle.

The code bar rest mechanism 102 includes an elongated longitudinally disposed bar 160 mounted for pivotal motion with a horizontal rod 161 journalled at its ends in supports 162. The bar 160 is provided with a substantially free horizontal and inwardly extending reset lip 164 at its upper or free end which is adapted to engage a cam slot 166 having a downwardly and outwardly sloping surface 167 formed in the left end 168 of the code bar 60. The code bar reset mechanism 102 further includes a stationary solenoid 170 under joint control of the console 48 and a switch SW–1 to be described. The solenoid 170 has a horizontally reciprocable armature 171. A linkage including links 172 and 173 connect the armature 171 of the solenoid 170 to an upper free end of a link 175 secured at its lower end to the rod 161.

In operation, a set code bar 53 is reset, that is, a code bar positioned in its upper position depicted in FIGURE 17 is lowered or returned to its normal position, as depicted in FIGURE 17, by energization of the solenoid 170. Such energization can be accomplished automatically by switch SW–1 during the sorting cycle, in a manner to be described, or by depression of a manually controlled key on the console 48. Energization of solenoid 170 retracts the armature 171 causing links 172 and 173 to move rightwardly from the position shown in FIGURE 17 to the position shown in FIGURE 16. Such rightward movement pivots the link 175 clockwise about its lower end, in turn rotating the shaft 161 and pivoting the bar 160 clockwise from the position shown in FIGURE 17 to the position shown in FIGURE 16. When the bar 160 pivots clockwise, the reset lip 164 engages the cam edge 167 of the notch 166 formed in the end 168 of the code bar 53. Continued engagement of the reset lip 164 with the cam edge 167 of the notch 168 in conjunction with continued clockwise pivotal motion of the bar 160 urges the code bar 53 both rightwardly and downwardly from the position shown in FIGURE 17 to the position shown in FIGURE 16, resetting the code bar. Of course, if a plurality of code bars 53 are set, the reset operation described is effective to simultaneously reset all code bars.

A stop bar 152 disposed transversely relative to the ends 66 of the group of code bars 53 serves the dual function of limiting reset motion of the code bars 53 under the action of the reset lip 164 as well as insuring that the right-hand portions of the code bars 53 are urged downwardly returning their upper edge 69 to a position flush with the top surface 51A of the card support 51. The stop bar 152 has a downwardly and outwardly sloping cam surface 176 which engages a similarly sloping cam follower edge 177 formed in the upper corner of the end 66 of the code bar 53. Surface 176 is effective to cause the code bar 53 to be urged downwardly as the reset lip 164 moves the code bars rightwardly, as viewed in FIGURE 16, during the code bar resetting operation.

The locking bar 54, which is slideably mounted in the slot 52–2 support 51, has two stable positions, namely, an upper position and a lower position. In the lower position, the upper edge 180 is flush with the top surface 51A of the card support 51 while in the upper position, the upper edge 180 of the lock bar 54 extends above the top surface 51A of the card support 51 a distance slightly less than the length of the vertical edge 27 of the card lock notch 25 which defines the height of the lock notch. The lock bar 54 is selectively shifted between its upper and lower positions by a lock bar actuator generally indicated by the reference numeral 181.

Figure 13:
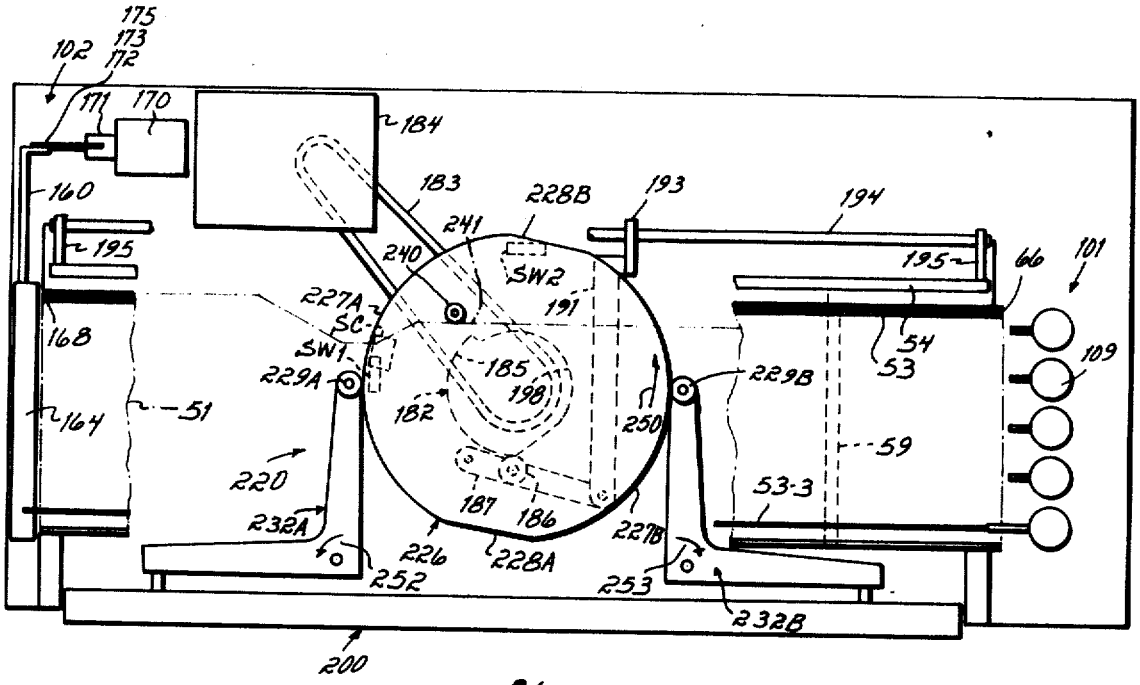

More specifically, the lock bar actuator 181 includes a cam 182 which is driven one revolution per card sorting cycle in any suitable manner, for example, by a motor 184 and chain 183 (FIGURE 13). The cam 182 has large and small radius lobes 185 and 198, respectively, formed on the periphery thereof which cooperate with a follower wheel 186 rotatably mounted on a lever 187 at a point intermediate an end 188 pivotally mounted to a stationary pin 189 and an end 190 pinned to a link 191. Link 191 in turn is pinned to the lower end 192 of a link 193, the upper end of which is fixedly secured to a shaft 194. The shaft 194 at its ends is rigidly secured to a pair of identical links 195 whose other ends 196 are connected to the ends of the lock bar 54 by arms 197.

Figure 15:
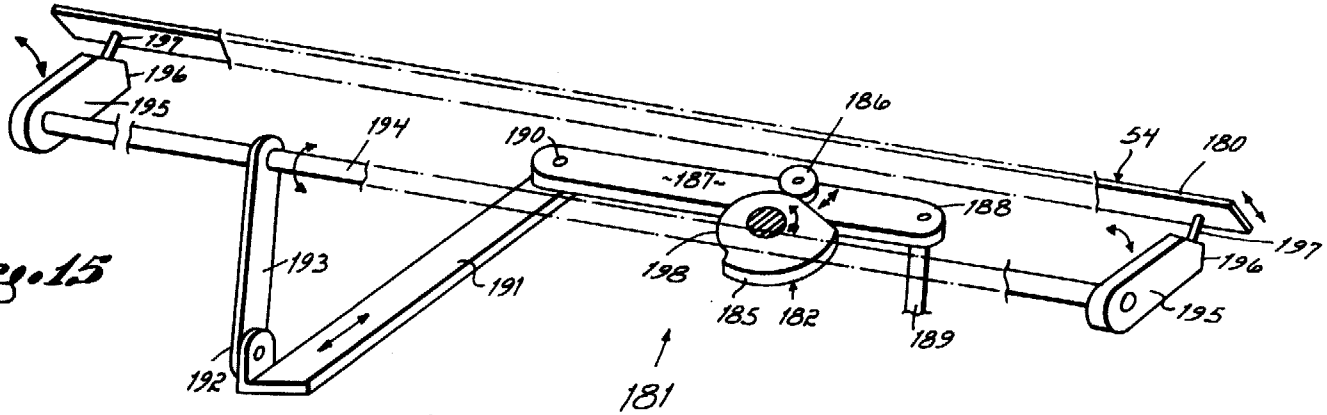
FIGURE 15 is a schematic view in perspective of the lock bar and lock bar actuating mechanism.

In operation, when the cam 182 is in its normal start position depicted in FIGURE 15, the small radius lobe 198 contacts the cam follower wheel 186, causing the links and arms 187, 191, 193, 196 and 197 to position the lock bar 54 in its normal lower position with its upper edge 180 flush with the top surface 51A of the card support 51. During the course of the card sorting cycle in a manner to be described in more detail hereafter, the cam 182 rotates in the direction of the arrow associated therewith eventually bringing large radius lobe 185 in contact with the cam wheel 186. When this occurs, the lever 187 moves in a clockwise direction about pivot 189 driving the link 191 toward the back 50B of the cabinet 50. The motion of the link 191 pivots the link 193, the shaft 194, the links 195 and arms 197 in a counterclockwise direction, as viewed in FIGURE 15, in turn raising the lock bar 54 to its upper limit of travel.

Continued motion of the cam 182 in the direction of the arrow associated therewith allows the cam follower wheel 186 to move radially inwardly on the cam which in turn permits the links and arms 187, 191, 193, 196 and 197 to assume the position shown in FIGURE 15. The return of the lock bar 54 to the position shown in FIGURE 15 results as a consequence of the weight of the bar 54 which tends to rotate the links and arms 196 and 197 clockwise, as viewed in FIGURE 15, rotating the shaft 194 and links 193 clockwise to draw the link 191 toward the front panel 50F of the housing 50, in turn driving the cam follower wheel 186 radially inwardly on the cam lobe 198 via the pivotal lever 187. Alternatively, the lock bar 54 may be spring biased in any suitable manner to insure its return to a retracted position.

The card separators 70 of the positioning and sorting apparatus 49 preferably take the form of flat plates dimensioned slightly smaller than the cards 10, as shown in FIGURE 1. The separators 70 are vertical and disposed transversely of the sorting and locking bars 53 and 54, respectively. Preferably the card separators 70 are not positioned from each other at a distance in excess of approximately one-third the height of a card 10, that is, at a distance in excess of one-third the distance between edges 11 and 12 of a card. With the horizontal separation of the card separators 70 so dimensioned, a card such as card 10E solely occupying the space between two separators such as 70E and 70F, while angled with respect to the separators 70E and 70F does not lie flat. That is, the card 10E does not become parallel to the top surface 51A of the card support 51. Consequently, should a card such as 10E be the sole card occupying the space or compartment between a pair of adjacent separators such as 70E and 70F the card would always be disposed in an operative sorting position, that is, with its sorting edge 12 operatively associated with the sorting and lockng bars 53 and 54, respectively.

Also included in the card positioning and sorting apparatus 49 is the carrier generally indicated by the reference numeral 200. The carrier 200, as shown in FIGURES 1 and 10, includes the rectangular panel 201 which is dimensioned to fit in the removed portion of the front wall 50F of the cabinet 50 and when so positioned forms therewith the front of the apparatus 49. The panel 201 is mounted for horizontal motion in the direction of arrow 202 (FIGURE 1) by a pair of horizontally and rearwardly extending arms 203. Arms 203 are slideably mounted in parallel, horizontally disposed, oppositely positioned grooves 204 formed in a pair of stationary guide blocks 205 extending between the front and rear panels 50F and 50B of the cabinet 50.

The card storing and sorting apparatus 49 further includes a horizontal positioning bar 72 mounted on the rear surface 79 of the front panel 201 of the carriage 200 in alignment with the positioning notches 40 of properly stored cards 10. The positioning bar 72 includes a horizontally extending lip 73 having a cross section configured to snugly engage the positioning notch 40 of the cards. Specifically, the lip 73 includes a sloping cam surface 74 angled parallel to the edge 41 of the positioning notch 40 formed in the card 10. The positioning bar 72 and its associated lip 73, particularly the sloping cam surface 74, when engaged with the card positioning notch 40, functions to cam the cards 10 downwardly urging the portions of their respective sorting edges 12 adjacent the chips 30 against the upper surface 51A of the card support 51, and thereafter maintain the sorting edges 12 of the engaged cards so positioned in operative relationship to the sorting and locking bars 53 and 54, respectively, during the initial phase of the card sorting process.

As shown in FIGURE 1, a horizontally extending stationary cam surface 85 in the form of a partial cover for the stored cards extending between housing side panels 50R and 50L is also embodied in the preferred card storage and sorting apparatus 49. The cam 85 insures that the portion of the sorting edge 12 of the card 10 adjacent the lock notch 25 is urged in intimate contact with the top surface 51A of the card support 51 when the cards are located in their proper storage position. As shown more particularly in FIGURE 22, the cam surface 85 is slightly inclined with respect to the top surface 51A of the card support 51. The degree of inclination of the cam surface 85 is such that the rear edge 86 of the cam surface is located above the top surface 51A of the card support 51 a distance equal to the length of the side 13 of the card 10.

The inclination of the cam surface 85 relative to the top surface 51A of the card support 51 insures that as the cards 10 are urged in the direction of arrow 202B by the carrier 200 the cards are cammed downwardly in the direction of arrow 87 (FIGURE 22) urging the portion of the sorting edge 12 adjacent the lock notch 25 into intimate contact with the top surface 51A of the card support 51.

The cam surface 85, in addition to urging the portion of the sorting edge adjacent the lock notch 25 into contact with the card support 51 of those cards not initially so positioned, also serves an additional function. Specifically, the cam surface 85 serves to maintain cards, once positioned with their portions of the sorting edge 12 adjacent the notch 25 in intimate contact with the top surface 51A of the card support 51, in such position during the initial phases of the sorting cycle.

Thus, the cam surface 85 performs for the portion of the sorting edge 12 adjacent the lock notch 25 the same function as the positioning bar 72 performs for the sorting edge 12 adjacent the chip 30.

The card storage and sorting apparatus 49 additionally includes a horizontal magnet 77 also mounted on the rear surface 79 of the front panel 201 of the carriage 200 in alignment with the chips 30 of properly stored cards 10. The vertical dimension of the magnet 77 is such that it extends along substantially the entire vertical edge 29 of the chip 30. The magnet 77 is preferably a permanent magnet and functions to magnetically attract the chips 30 of the cards 10 and when moved leftwardly, in a manner to be described hereafter, exerts a lateral force on the cards 10 in the direction of arrow 23 (FIGURE 2).

A carriage actuating assembly 220 is provided to move the magnet 77 a distance equal to the width of a card tooth 17 and in a direction parallel to the arrow 202A (FIGURE 1) for applying a lateral force to the stored cards 10 to effect initial separation of the cards during the sorting cycle, as well as to produce continued motion of the magnet in the direction of the arrow 202A for the purpose of producing further separation of the initially selected and separated cards. The carriage actuating assembly 220 includes a cam 226 adapted to be driven by the chain 183 one complete revolution per sorting cycle. The cam 226 is provided with a pair of oppositely disposed peripheral arcuate lobes 227A and 227B separated by oppositely disposed peripheral flat lobes 228A and 228B of lesser radius.

Cooperating with the cam 226 are a pair of cam follower wheels 229A and 229B mounted on the free ends of arms 231A and 231B, respectively, of identically configured bell cranks 232A and 232B which are pivotally mounted on stationary pins 233A and 233B disposed symmetrically about the cam 226. Arms 234A and 234B form the other portion of the bell cranks 232A and 232B respectively. The pair of bell cranks 232 in combination with the cam 226 enable balanced forces of large magnitude to be applied to the carrier 200. This prevents the carrier arms 203 from bending in the guide grooves 204 should the resistance to carrier motion be unbalanced due to their being an unbalanced distribution of cards in the compartments formed by the separators 70.

The carriage actuating assembly 220 further includes a cam wheel 240 eccentrically mounted on the upper surface of the cam 226, and a cam follower plate 241 rigidly secured at its ends to the inner surface of the carrier arms 203.

In operation, the initial motion of the chain driven cam 226 in the direction of arrow 250 causes the cam wheels 229A and 229B to move off the lesser radius flat lobes 228A and 228B, respectively. This action urges the cam follower wheels 229A and 229B outwardly pivoting the bell cranks 232A and 232B in the direction of arrows 252 and 253, respectively, about their respective pivots 233A and 233B. The pivotal bell crank motion drives the free ends of the bell crank arms 234A and 234B in the direction of arrow 202A, in turn driving the carrier front panel 201 outwardly. The motion of the carrier front panel 201 imparts similar motion to the positioning bar 72 and the magnet 77 which it carries. The difference in the radii of the cam lobes 227 and 228 is selected such that the motion of the carrier front panel 201 under the action of the cam follower 229 and bell crank 232 drives the magnet 77 a distance in the direction of the arrow 202A equal to the width of a card tooth 17, to initially separate conformingly notched cards from nonconformingly notched cards, in a manner to become apparent hereafter.

Further rotation of the chain driven cam 226 drives the cam wheel 240 in the direction of arrow 202A, in turn driving the cam follower plate 241 and, hence, the carrier front panel 201 in the direction of arrow 202A. The continued motion of the carrier front panel 201 in turn imparts additional motion to the magnet 77 further separating the initially separated cards. The location of the cam wheel 240 with respect to the cam 226, as well as the location of the cam 226 relative to the cam follower plate 241, is such that the carrier panel 201 and the magnet 77 which it carries advance under the action of the cam wheel 240 and cam follower plate 241 a distance sufficient to fully separate cards selected during the initial separation stage under the action of cam follower wheel 229 and bell crank 232.

A normally open stationary switch SW–1 in series circuit arrangement with the reset solenoid 170 cooperates with a switch actuating cam SC mounted to the underneath surface of the cam 226 for momentarily energizing the reset solenoid 170 once per revolution of cam 226, that is, once each sorting cycle. The location of the switch actuating cam SC is such that it momentarily closes the switch SW–1, at the appropriate point in the sorting cycle to be described, momentarily completing an energization circuit to the reset solenoid 170 to reset the code bars 53.

A normally closed stationary switch SW–2 in series with motor 184 cooperates with the switch actuating cam SC for facilitating selective energization of the motor 184 in one revolution increments. The switch SW–2 is positioned relative to the cam SC such that when the cam 226 is in the position shown in FIGURE 11, which corresponds to beginning and end points of a sorting cycle, the cam SC opens the switch SW–2 interrupting an energization circuit to the motor 184. Energization of the motor 184 when the cam SC is in the rest position of FIGURE 11 and the switch SW–2 is open is effected by momentarily short-circuiting the switch SW–2 in any convenient manner, for example, by momentarily actuating a normally open console switch connected in parallel with switch SW–2. Short-circuitig switch SW–2 energizes motor 184. This causes cam 226 to rotate and angularly displace cam SC relative to the switch SW–2, allowing switch SW–2 to return to its normally closed condition. In this condition the motor 184 is maintained in an energized state driving the chain 183 and cams 226, 182 and SC.

When the cam SC rotates through one complete revolution it actuates switch SW–2, interrupting the only existing energization circuit to the motor, the energization circuit through the parallel connected console switch having been only of a temporary or momentary nature. With the switch SW–2 open, the motor 184 stops and remains at rest in the position shown in FIGURE 11 until the switch SW–2 is once again momentarily short-circuited by momentary actuation of the parallel connected console switch.

The console 48 may be of any desired design. Preferably, the console 48 should be provided with keys which when momentarily actuated are effective to momentarily close switches, for example, the console 48 preferably should be provided with a start key which when momentarily actuated momentarily closes a console switch connected in parallel with the switch SW–2 for the purpose of momentarily short-circuiting switch SW–2 to initially energize the motor 184 and, hence, commence the sorting cycle.

The console also preferably should be provided with a reset key which when momentarily actuated is effective to momentarily close a console switch to produce momentary energization of the reset solenoid 170 for the purpose of actuating the code bar reset mechanism 102 to reset the code bars 53 to the position shown in FIGURE 16. With such a key it is possible to selectively reset the code bars thereby providing code bar reset capability in addition to that provided by the combination of switch SW–1 and cam SC. Such additional reset capability is desirable when, for example, a mistake has been made in setting the code bars 53 and it is desired to reset the code bars and re-enter the proper code corresponding to the card to be selected.

The console 48 should further be provided with a plurality of code keys which, when momentarily actuated, close appropriate console switches in energization relationship with various ones of the solenoids 109 to thereby permit, by actuation of the code keys, the energization of the solenoids 109 and, hence, the setting of the code bars 53. The code keys should also have associated therewith a console switch in energization relationship with the stepping solenoid 155 which is effective to energize the stepping solenoid 155, and thereby increment the carriage 108 each time a code key is depressed and one or more of the solenoids 109 actuated to enter into the sorting apparatus the code of a card or cards to be selected.

The console 48 should also include a key which when actuated is effective to momentarily close a console switch in energization relationship with the stepping solenoid 155 which is effective to momentarily energize the stepping solenoid 155 and permit selective incrementing of the carriage 108 independent of that occurring as an incident to actuating the code keys and setting the code bars.

OPERATION

A complete card sorting cycle is now described. For the purpose of this operational description, it is assumed that it is desired to retrieve a card having the notch configuration of the card 10 depicted in FIGURE 2 (card 10' of FIGURES 3–9). Specifically, in the following operation description, it is assumed that it is desired to select from a group of randomly stored cards, of which two cards 10' and 10'' are shown in FIGURES 3–9, the card 10' having removed therefrom the tooth 17–3 of the code site 15–3 located third from the left vertical card edge 14. It is further assumed that all of the code bars 53 have been reset by the reset mechanism 102 to their normal position shown in FIGURE 16, and that the lock bar 54 resides in its normal lowered position (see FIGURE 3).

To initiate the card sorting cycle it is necessary to position the cards 10 in the compartments formed by the separators 70 with their sorting edges 12 lowermost. When the cards have been so positioned, the carrier front panel 201 is returned to a position flush with the housing front panel 50F by pushing it rearwardly, that is, in the direction of arrow 202B (FIGURE 1). As the carrier front panel 201 is urged rearwardly with its associated arms 203 sliding in the grooves 204 of the guide blocks 205, the positioning bar 72 mounted on the rear wall 79 engages the card positioning notches 40 of those cards 10 not yet located in the proper sorting position, that is, with their sorting edges 12 in contact with the top surface 51A of card support 51 and their registration and lock notches 16 and 25, respectively, aligned with slots 52–1 and 52–2, respectively. Specifically, the downwardly sloping cam surface 74 of the positioning bar 73 engages the downwardly sloping edges 41 of the positioning notches 40 of improperly positioned cards urging the cards downwardly to a point where sorting edge 12 of the card 10 is in contact with the upper surface 51A of the card support 51. The exact point at which the positioning bar 72 engages the positioning notch 40 of a given card 10 depends upon the extent to which the card so engaged is initially displaced in a direction parallel to the sorting edge 12 from its proper storage position.

As the carrier 200 moves rearwardly in the direction of arrow 202B, the positioning bar 72, in addition to engaging the positioning notches 40 and urging the portion of the sorting edges 12 adjacent the chips 30 against the top surface 51A of the card support 51, also serves to displace rearwardly in the direction of arrow 202B cards initially laterally displaced relative to the remainder of the properly stored cards, returning them to their proper storage position with their registration notches 16 and lock notches 25 aligned with the slots 52–1 and 52–2, respectively. Specifically, as the carrier 200 moves rearwardly in the direction of arrow 202B driving cards initially displaced from their proper storage position in the direction of arrow 202B the cam surface 85 in the manner described previously cams the cards downwardly in the direction of arrow 87 bringing the portion of the sorting edge 12 adjacent the lock notch 25 into intimate contact with the top surface 51A of the card support 51.

The rearward motion of the carrier 200 also functions to bring the magnet 77 to a point adjacent the ferromagnetic chips 30 of the stored cards.

Thus, rearward positioning of the carrier 200 positions the cards in their proper storage position with their registration notches 16 and lock notches 25 aligned slots 52–1 and 52–2, respectively, and their sorting edges 12 in complete contact with the top surface 51A of the card support 51, as well as positions, the magnet 77 adjacent the card chips 30.

With the cards properly stored, the next step is to set or raise the code bars 53 such that the pattern of actuated code bars corresponds to the notch pattern of the desired card. In this example, it is assumed that the desired card 10' has the tooth 17–3 of the third code site 15–3 from the left or leading edge 14 of the card removed. Consequently, it is necessary to set or raise the sorting bar 53–3 aligned with the registration notch 16–3 of the notch site 15–3 in which the third tooth 17–3 from the left is contained. This is accomplished by making the appropriate entries into the console 48.

Figure 3:
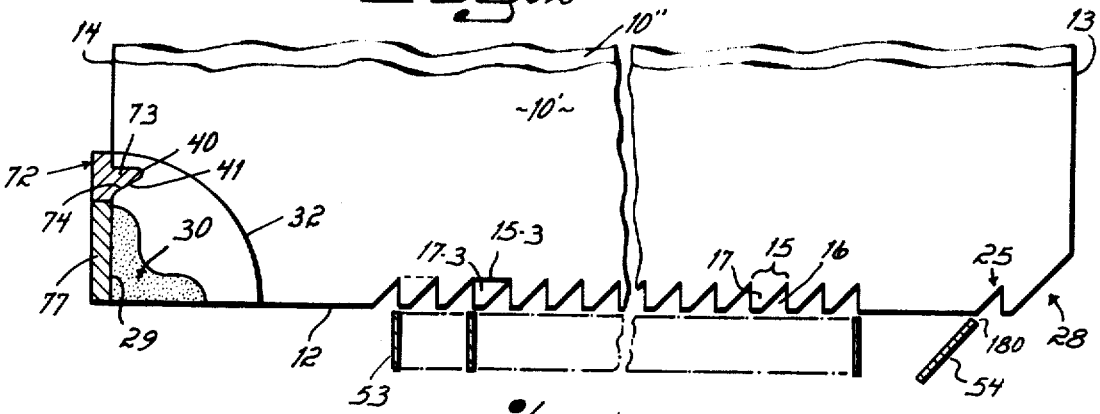
FIGURES 3–9 are diagrammatic elevational views of portions of a selected and an unselected card, showing their relative positions which respect to each other and to the magnet, code bars, and lock bar during successive portions of a card sorting cycle.
Figure 4:
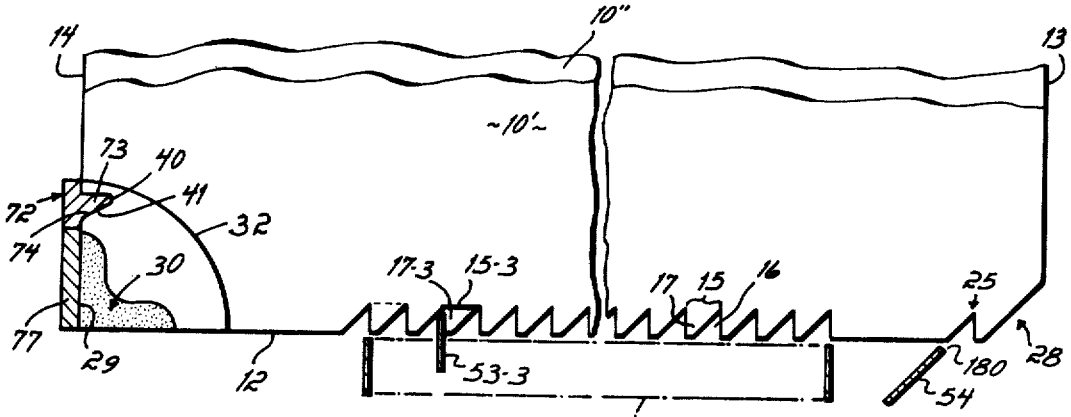

More specifically, the appropriate code bar 53–3 is raised by depressing the appropriate keys of the console 48 to cause the stepping mechanism 130 to advance the carriage 108 to the point where the associated solenoid 109 when actuated laterally shifts the desired code bar 53–3 from the position shown in FIGURE 3 to the position shown in FIGURE 4. When the third code bar 53–3 has been shifted leftwardly as viewed in FIGURES 16 and 17, the code bar is in the set condition as shown in FIGURE 4. That is, the code bar 53–3 is elevated into the third registration notch 16–3 associated with the code site 15–3 containing the third tooth 17–3.

Setting of the sorting bars 53, in conjunction with the right triangular registration notch 16 into which the raised or set sorting bar 53–3 is elevated, performs a registering function, namely, positioning the cards 10 should they be slightly out of registration with respect to the code bars 53. Specifically, if a card 10 is slightly misaligned, that is, its registration notches 16 do not register precisely with the code bars 53, setting of one or more code bars causes the card to shift along its sorting edge until properly registered. The necessary positioning motion for registering the card is produced by the camming interaction between the rising top edge 60 of the sorting bar and the angled edge 18 of the registration notch.

With the coding bars 53 corresponding to the notch pattern of the desired card set, as depicted in FIGURE 2, the next step in the sorting operation is to apply a force to the cards 10' and 10'' in a manner such that they tend to move in a direction parallel to their sorting edge. This is accomplished by actuating the appropriate key on the console 48 to momentarily short-circuit the now open switch SW–2, thereby energizing the motor 184 in the manner previously described and rotating the cam 226 from the position shown in FIGURE 11 to the position shown in FIGURE 12. As the cam 226 rotates to this new position, the large radius cam lobes 227 drive the cam follower 229 outwardly pivoting the bell crank 232, which in turn urges the carrier front panel 201 in the direction of arrow 202A a distance equal to the width of one card tooth 17.

Figure 5:
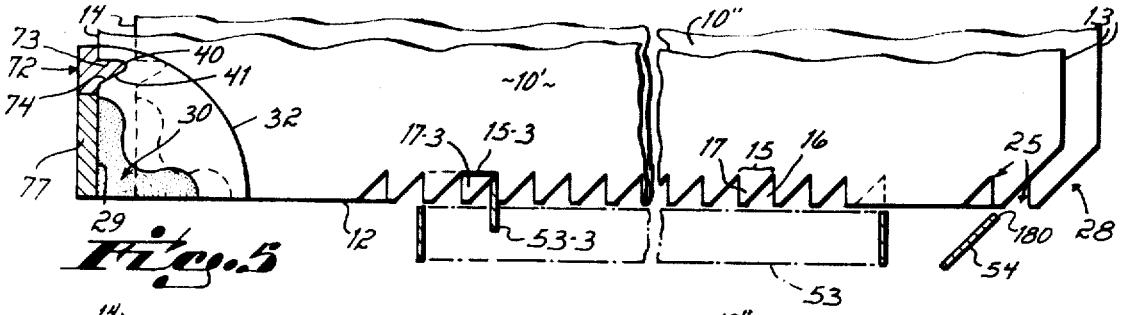

The above movement of the carrier from panel 201 advances the magnet 77 an equal distance from the position shown in FIGURE 4 to the position shown in FIGURE 5, applying an attractive force in the direction of arrow 202A to all of the cards 10' and 10'' via their respective ferromagnetic chips 30. This attractive force is effective to move the desired card 10' relative to the undesired card 10'' from the position shown in FIGURE 4 to the position shown in FIGURE 5, that is, to move the desired card 10' in a direction parallel to the sorting edge 15 and for a distance equal to the width of one card tooth 17 thereby exposing the lock notch 25 of the undesired card 10''. Such movement is possible, notwithstanding that the third code bar 53–1 is set or elevated, because the third tooth 17–3 of the desired card 10' is removed. The undesired card 10'' having a notch pattern not conforming with the pattern of the set or elevated code bars 53 is restrained from movement in the direction of arrow 202A under the force of magnet 77 by the engagement of the set code bar 53–3 with their respective teeth 17–3. Consequently, the undesired card 10'' remains stationary.

At this point, the desired card 10' has been relatively displaced from the undesired card 10'' a distance equal to the width of one tooth 17 and therefore, has undergone initial separation from the undesired cards 10''. The desired card 10' and undesired card 10'' are now in the positions shown in FIGURE 5, with its lock notch 25 exposed, the carrier actuator assembly 220 is in the position shown in FIGURE 12, the code bar 53–3 is set, and the lock bar 54 is reset.

Figure 6:
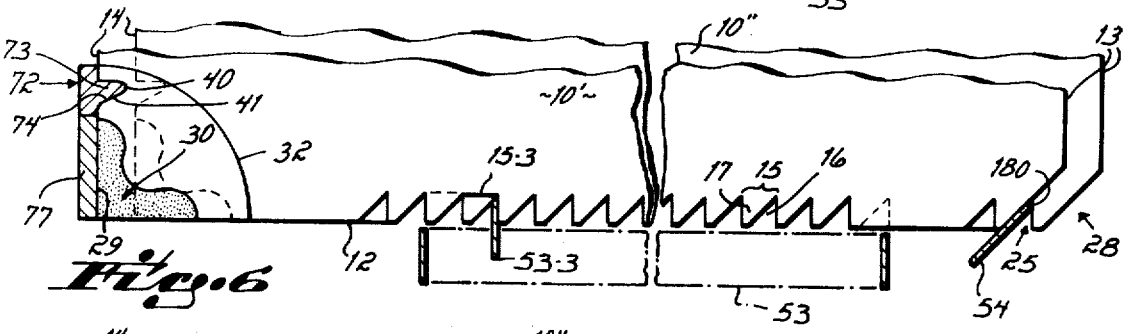

The unselected card 10'' which has remained stationary while the desired card 10' has advanced leftwardly the width of one tooth is now positively locked in place by setting the lock bar 54, that is, by raising the lock bar from the position shown in FIGURE 5 to the position shown in FIGURE 6. Setting the lock bar 54 is automatically accomplished by the continued rotation of the chain driven cam 182 from the position shown in FIGURE 12 to the position shown in FIGURE 13. When cam 182 rotates to the position shown in FIGURE 12, cam lobes 185 contact the cam follower 186, urging the latter radially outwardly. This in turn raises the lock bar 54 into the now exposed lock notches 25 of the undesired and stationary card 10'', via the linkage 187, 191, 193, 194, 195 and 197, to the position shown in FIGURES 6 and 21, thereby positively restraining the undesired card having nonconforming notch patterns.

Setting of the lock bar 54, due to its rearward component of motion during the setting thereof, accomplishes a secondary function in addition to restraining the undesired card 10''. Specifically, the setting of the lock bar 54 urges the undesired card 10'' slightly rearwardly in the direction of the arrow 202B. This rearward card motion relaxes the pressure exerted on the set code bar 53–3 by the unselected card 10'' which has been urged leftwardly against the code bar 53–3 by the magnet 77 during the initial card separation phase of the sorting cycle. With this pressure on the set code bar 53–3 relaxed, the bar is free to drop into its normal position when the code bar 53–3 is reset by the reset lip 164.

Figure 7:
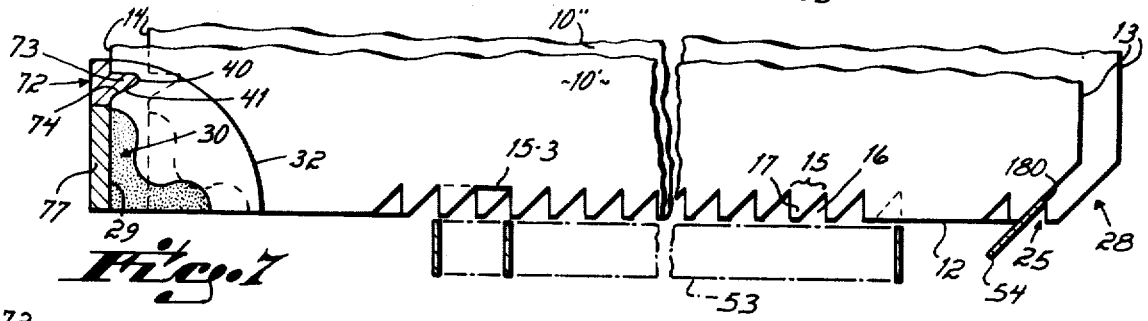
Figure 8:
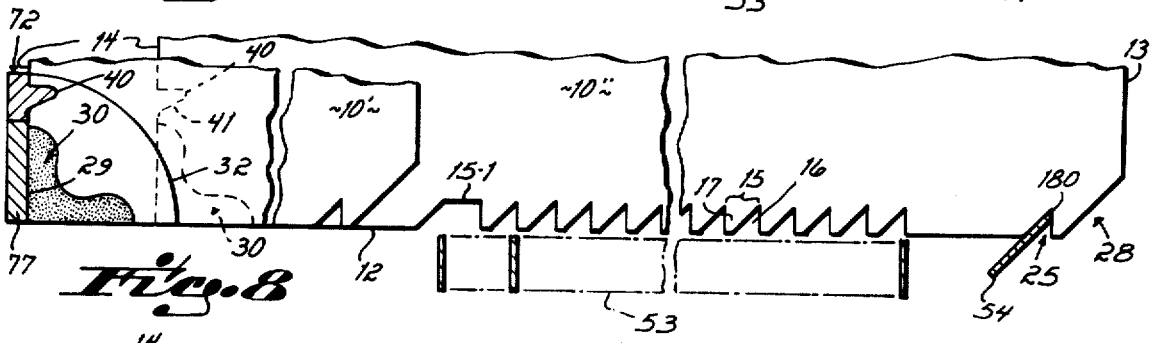

With the undesired card 10'' positively locked by engagement of lock notch 25 and the raised or set lock bar 54, the set code bar 53–3 is reset by the code bar reset mechanism 102. Specifically, the raised code bar 53–3 is reset by energization of the solenoid 170 which occurs when the switch cam SC mounted on the underneath surface of the cam 226 momentarily actuates or trips the reset solenoid switch SW–1. Momentary energization of solenoid 170 pivots the reset lip 164 clockwise as viewed in FIGURES 16 and 17 returning the elevated code bar 53–3 from the position shown in FIGURE 17 to its normal lowermost position shown in FIGURE 16. At this point, the code bar 53–3 is reset, the undesired card 10'' is positively locked by the lock bar 54, and the desired card 10' is displaced in the direction of the sorting edge a distance equal to the width of the one tooth 17, as shown in FIGURE 7.

Figure 9:
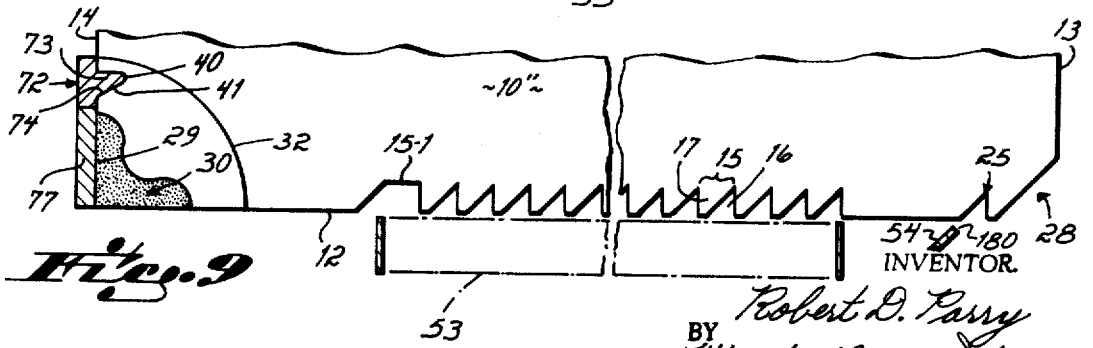
Figure 14:
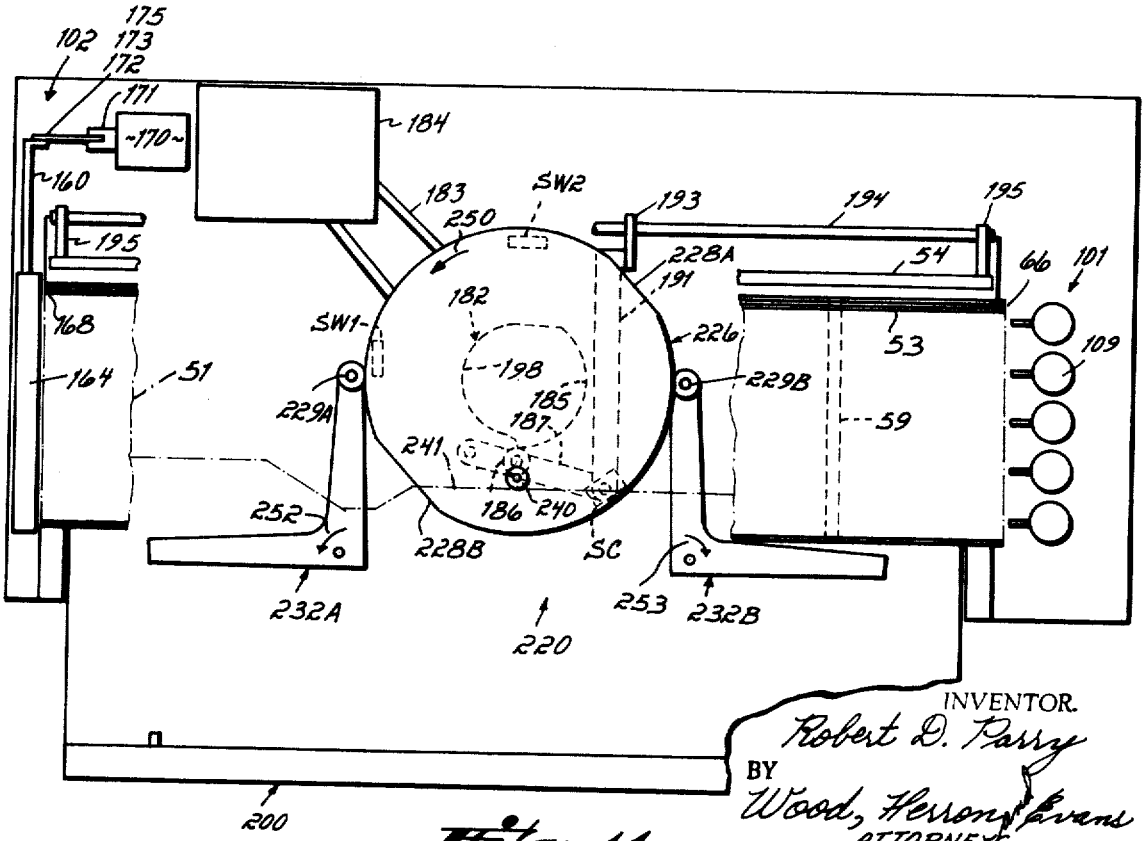

Further separation of the selected card 10' from the positively locked undesired cards 10'' is effected by further advance of magnet 77 in the direction of arrow 202A. This further motion of the magnet 77 is produced by rotation of the cam 220 and cam wheel 240 in the direction of arrow 250 from the position shown in FIGURE 13 to the position shown in FIGURE 14. Such motion drives the cam follower plate 241, arms 203, carrier front panel 201 and, hence, the magnet 77 in the direction of the arrow 202A. The motion of the magnet 77 produced by co-action of the cam wheel 240 further separates the selected card 10', advancing it from the position shown in FIGURE 7 to the position shown in FIGURE 8. Maximum advancement of the carrier front panel 201, magnet 77 and hence, of the selected card 10' occurs when the cam wheel 240 reaches the position shown in FIGURE 14. Additionally, when cam wheel 240 reaches this point, the cam 182 has rotated through an angle such that the larger radius lobe 185 is about to leave the cam follower wheel 186, permitting the lock bar 54 to return to its lower position, unlatching the unselected card 10'' as shown in FIGURE 9.

As the selected card 10' is being further separated, the positioning bar 72 prevents the leading edge of the card from becoming angled with respect to the magnet which would otherwise tend to occur due to the normal interaction between the cards. By preventing angulation between the magnet 77 and the leading edge of the selected card 10', the vertical chip edge remains in contact with the magnet and the full attractive force of the magnet continues to be applied to the card with the result that the card does not become separated from the magnet during the latter part of the sorting cycle.

Figure 11:
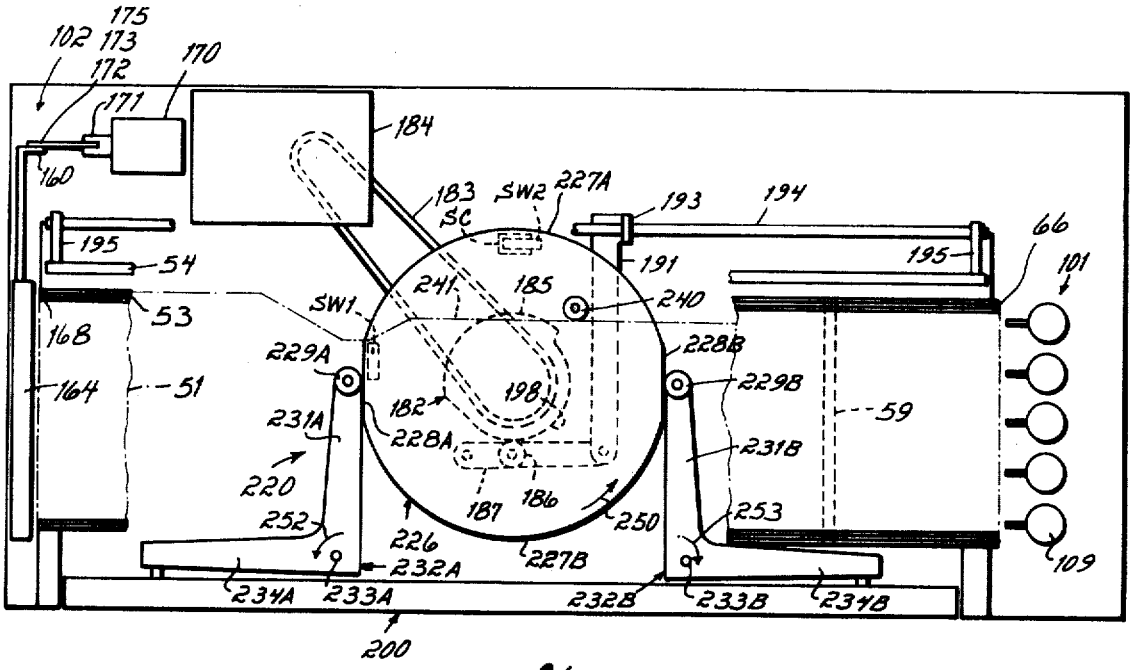
FIGURES 11–14 are schematic top plan views of various components of the preferred card storage and sorting apparatus showing their relative relationships during seccessive portions of a card sorting cycle.
Figure 12:
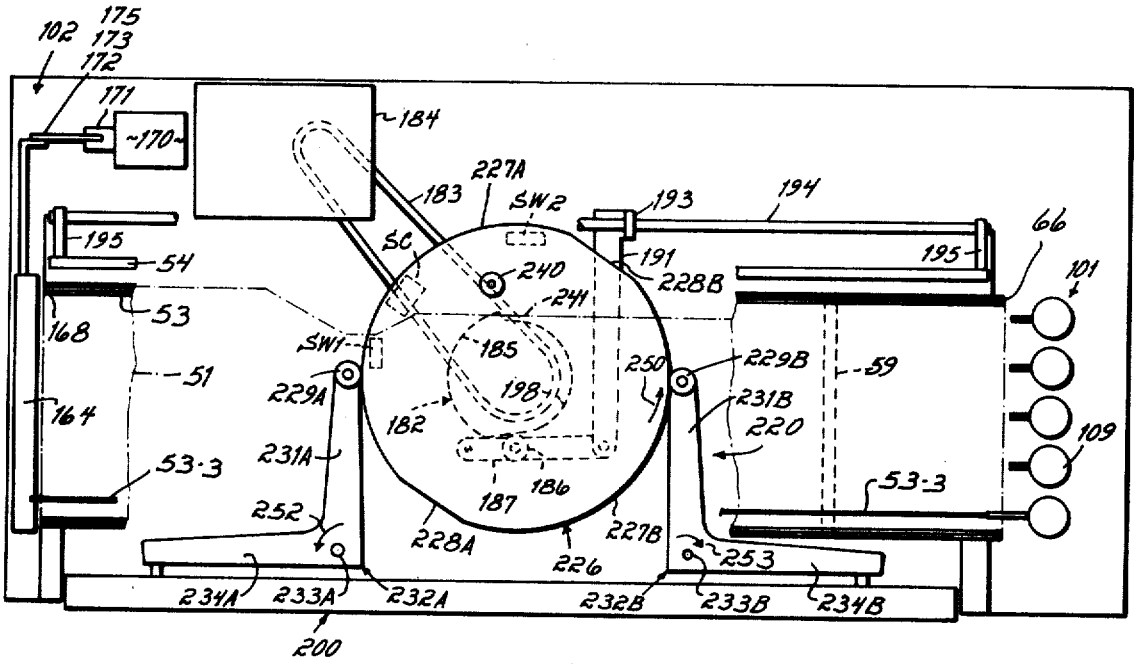

The motor 184 continues driving the chain 183 and, hence, the cam 226, eventually returning the cam 226 to the position shown in FIGURE 11. Upon arrival of the cam 226 in this position, the switch cam SC actuates the switch SW–2, de-energizing the motor. De-energization of the motor 184 causes the cams 226 and 182 to immediately come to rest at their starting point depicted in FIGURE 11, in the manner previously described. With the cam 182 in this position, the switch SW–2 is held in its open condition maintaining motor 184 de-energized.

If desired, the selected card 10' can be further separated from the deck of unselected cards 10'' by manually advancing the carrier panel 201 in the direction of arrow 202A which, via the magnet 77 imparts further movement to the card. Alternately, the desired or selected card 10' can be manually disengaged from the magnet 77 and removed from adjacent the unselected card 10'' for inspection, as shown in FIGURE 9, wherein only the undesired card 10'' is depicted.

The foregoing operational description, for the purpose of simplicity, was described with respect to selecting a single card 10' from a group of two cards, namely, the selected card 10' and a single unselected card 10''. As those skilled in the art will appreciate, the sorting operation is not limited to selecting merely one desired card from a group of two cards. On the contrary, it is contemplated that a large group of desired cards 10' may be simultaneously selected from an even larger group of cards including a great number of undesired cards 10''. For example, it is contemplated that in one sorting cycle 10, 20, 50, 100 or more cards may be selected simultaneously from a group of, for example, two thousand cards.

From the description of the operation of the preferred embodiment of this invention, it is apparent that the invention has the capability of selecting alternately positioned cards, that is, every other card, from a group of cards stored in the card storing and sorting apparatus 49. Without the means of this invention for locking the unselected cards following the initial separation of the selected cards from the unselected cards, it would not be possible to reliably select alternately positioned cards from the deck of stored cards. This inability to select alternate cards without the utilization of positive locking means for the unselected cards is attributable to the fact that sufficient frictional drag exists between adjacent cards to drag unselected cards from the deck of stored cards as the selected cards are being further separated during the latter portion of the sorting cycle. The effect of frictional drag will readily be appreciated if it is realized that when alternate cards are selected, each unselected card is interposed or sandwiched between a pair of selected cards. This sandwiching of undesired cards between a pair of selected cards coupled with the frictional drag between adjacent cards is sufficient, when alternate cards are undergoing further separation, to also select those cards which are not desired.

It is also apparent from the foregoing operational description that this invention has the ability to select a card, such as card 10E of FIGURE 1, solely occupying a compartment, such as the compartments formed by separators 70E and 70F. The provision of a sorting edge along the bottom of the card as described in conjunction with the preferred embodiment enables the selection of a card from a deck of stored cards, notwithstanding the card may be the only one occupying a compartment. This capability of selecting the sole card occupying a compartment formed by a pair of adjacent separators avoids the need for providing in each card compartment a spring device for biasing the cards against the separators to maintain them in an upright position. By eliminating the need for means to bias the cards to an upright position. the available space in a given size compartment for storing cards is increased inasmuch as space need not be provided in the compartment for card biasing spring means.

The preferred embodiment in which the sorting edge 12 is lowermost and the chip 30 aligned therewith has a further advantage, namely, it permits cards having a large vertical dimension to be used in the storting system. With the chip 30 aligned with the sorting edge 12 the force exerted on the card by the magnet 77 is directed substantially along the bottom or sorting edge. Such a force direction prevents a moment from being applied to the card during card separation in a manner which would tend to tilt it about the corner formed by the leading edge and the sorting edge as would otherwise occur if, for example, the chip were located substantially above the sorting edge. The absence of a moment applied to the card during card separation permits the use of very tall cards without the need for special cards or card handling equipment.

The various principles of this invention has been described with reference to a preferred form of card as well as with reference to a preferred form of card storage and sorting apparatus. As those skilled in the art will appreciate, many variations may be made in the preferred card and card storing and sorting apparatus without departing from the principles and scope of this invention. For example, a preferred card 10 has been described in connection with FIGURE 2 in which the positioning notch 40 is located at a point in the card edge 14 above the chip 30. If desired the positioning notch 40 may be formed in the chip 30. This strengthens the positioning notch 40 thereby lengthening the useful life of a card.

Figure 22:
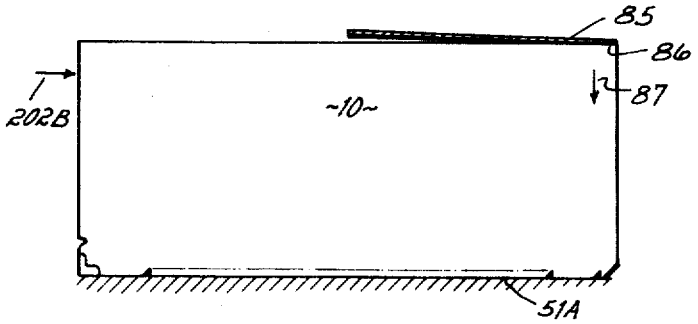
FIGURE 22 is an elevational view of a card showing its relationship to the card support and cover cam of a preferred embodiment of the card storing and sorting apparatus.
Figure 27:
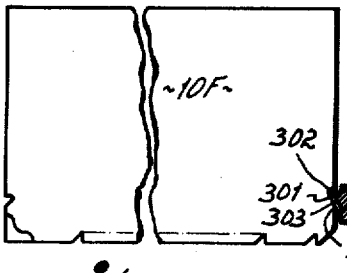
FIGURE 27 is a further modification of a card in which positioning notches in both vertical card edges are provided.

It is also contemplated that the card positioning cam shown in FIGURES 1 and 22 which functions to urge the portion of the sorting edge 12 adjacent the lock notch 25 in the direction of arrow 87 may also be replaced by the combination of a positioning bar 300 and a positioning notch 301 as shown best in FIGURE 27. The positioning bar 300 includes a lip 302 having a downwardly and rearwardly sloping cam surface 303 which engages a similarly sloping edge 304 forming part of the positioning notch 301. The positioning bar 300 is disposed transversely of the edge 13F of the card 10F in the housing 50 in a position such that when the cards 10F are in their proper storage location with their registration notches and locking notches aligned with the code bars and locking bars, respectively, the notch 301 is in intimate contact with the camming lip 302.

In operation, when a card 10F is initially displaced in the direction of arrow 202A (FIGURE 1) from its proper storage position and the carrier 200 is moved in the direction of arrow 202B, the card 10F is urged rearwardly in the direction of arrow 202B. Eventually, the positioning notch 301 engages the camming lip 302 whereupon the cam surface 303 urges the edge 304 of the positioning notch 301 downwardly, bringing the portion of the sorting edge 12 adjacent the lock notch 25 into intimate contact with the top surface 51A of the card support 51. As those skilled in the art will appreciate, the positioning bar 300 in addition to driving the cards in the direction of arrow 305 and bringing the sorting edge into contact with the card support 51 also functions to maintain the sorting edge in that position during the initial phase of the sorting cycle.

Figure 24:
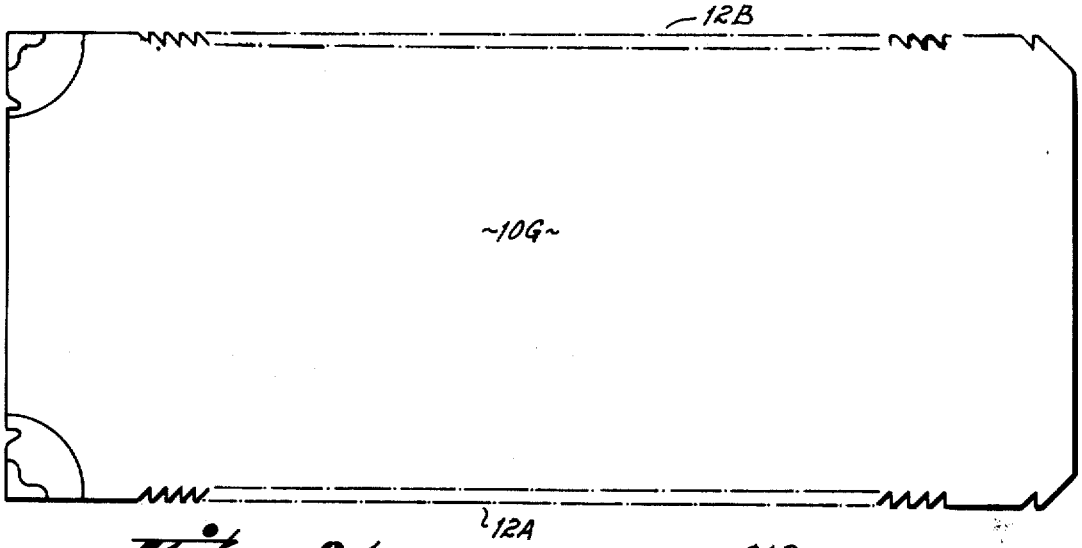
FIGURE 24 is an elevational view of a second preferred embodiment of a card in which a pair of parallel sorting edges are provided.

It is also contemplated that cards 10G having a pair of parallel sorting edges 12A and 12B, as shown in FIGURE 24, may be employed where it is desired to perform two sequential sorting operations on a single card or group of cards. If the card 10G having a pair of oppositely disposed sorting edges 12A and 12B is utilized, different code information is entered into the code sites 15 of the two sorting edges, and the cards 10G positioned in the card storing and sorting apparatus 49 in the compartments formed by the separators 70 in the same manner in which the single sorting edge cards 10 depicted in FIGURE 2 are positioned. With the cards so positioned, a first sorting cycle is effected in the manner described previously using first one of the edges, for example, edge 12A, of the cards 10G. Thereafter, the cards selected as a consequence of the first sorting cycle are removed from their respective compartments formed by the separators 70 and collectively positioned in an empty compartment, such as the compartment formed by the separators 70C and 70D (FIGURE 1), with their other sorting edge 12B in intimate contact with the top surface 51A of the card support 51.

With the cards selected in the first sorting cycle positioned as a group in the formerly empty compartment formed by separators 70C and 70D a second sorting cycle is made in the manner described previously operating on the sorting edges 12B of the cards. Upon completion of the second sorting cycle, the cards selected from the group of cards placed in the formerly empty compartment formed by separators 70C and 70D represent those cards selected in both the first sorting cycle, where the sorting edge 12A was operated upon, and those of the second sorting cycle, where the sorting edge 12B was operated upon.

Thus, by merely providing a card with a second sorting edge, it is possible to conduct sequential sorts on the cards. It should be noted that the concept of multiple sequential sorting is not limited in number to two sorts. It is contemplated that three or four card edges may be coded. Also, if only two edges are coded, they need not be parallel. It is contemplated that the two coded edges could be adjacent rather than parallel.

Figure 29:
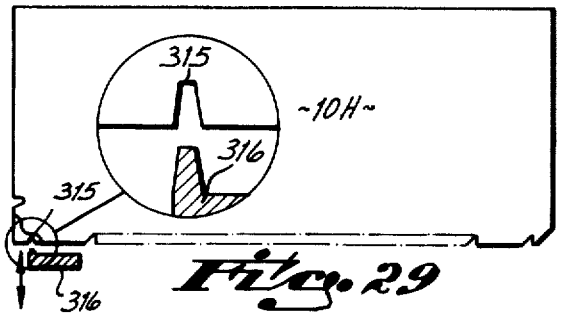
FIGURE 29 is a further modification of a card in which notches are formed in the bottom edge of the chip to assist the magnet during the further card separation phase of the sorting cycle.

If desired, it is possible as shown in FIGURE 29, to provide an inverted V-shaped notch 315 in the bottom edge of the chip 30A of a card 10H and a notch-engaging bar 316 selectively engageable with the notch 315. The combination of notch 315 and bar 316 positively engages selected cards initially separated from the deck of stored cards to facilitate positive gripping of the selected cards during subsequent and further separation of the selected cards from the unselected cards.

In accordance with the above contemplated modification, the notch 315 is positioned in the bottom edge of the chip 30A relative to the vertical chip edge such that if the card is selected during the martial separation stage of the sorting cycle it becomes exposed. By exposed is meant that the notch 315 would be displaced sufficiently in the direction of the arrow 202A during the initial card separation phase of the sorting cycle to clear the vertical edges of the unselected cards.

If the notch 315 and notch-engaging bar 316 are utilized, suitable means must be provided for raising the bar 316 from the position shown in FIGURE 29 into a position in which the bar engages the notch 315 upon completion of initial separation of the selected cards. In addition, suitable means must also be provided for enabling the bar 316 when so raised into engagement with the notch 315 to move in the direction of arrow 202A with the magnet 77.

As those skilled in the art will appreciate, the combination of the positioning bar 316 and the notch 315 aid the magnet 77 in further separating selected cards from the deck of unselected cards. Such aid makes possible the use of a magnet 77 and a chip 30F combination having lesser magnetic attraction therebetween, a producing in turn a lesser force tending to move the selected cards in the direction of arrow 202A during the further separation phase of the sorting cycle. The decrease in magnetic force on the cards 10H in the direction of arrow 202A is compensated for by the added force imparted to the cards 10H by the bar 316 which positively engages the notch 315.

Figure 28:
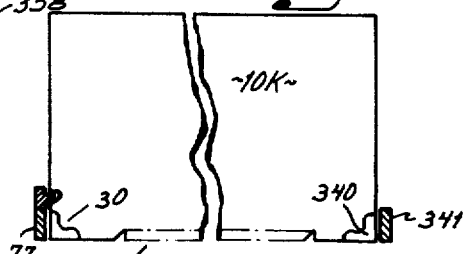
FIGURE 28 is a further modification of a card in which a magnetic locking arrangement is provided.

It is also contemplated that card locking means, other than the locking notch 25 and the lock bar 54 which cooperate to positively lock unselected cards 10″ during the latter portion of the sorting cycle when the selected cards 10′ are further separated from the unselected cards, may be utilized. For example, as shown in FIGURE 28, it is contemplated that instead of the lock notch 25 provided in the card 10, a chip 340 may be provided in the card 10K, and instead of the lock bar 54, a second magnet 341 disposed transversely of the cards 10K in alignment with the chips 340 may be provided.

In operation, following the initial separation of the selected cards from the unselected cards, the magnet 340 is moved into magnetically attractive relationship with the chips 340 of the unselected and stationary cards to restrain their movement during the subsequent portion of the sorting cycle when the magnet 77 further separates the selected cards whose chips 340 are not appreciably magnetically attracted by the magnet 341.

While in the preferred embodiment of the invention the relative movement to produce separation of the desired cards from the undesired cards is produced by moving the magnet 77, other manners of effecting the necessary relative movement between the selected and unselected cards may be employed. For example, it is possible to move the actuated sorting bars 53 while maintaining the magnet 77 stationary, and thereby initially separate the selected cards from the unselected cards. With the unselected cards being displaced in the direction of their sorting edge a distance equal to the width of one tooth 17, the lock notches of the unselected cards are exposed, enabling the locking bar to be raised to positively restrain movement of the unselected cards. Once the locking bar has been so engaged, the sorting cycle can continue and the selected cards may be further separated from the deck by moving the magnet 77 in a direction parallel to the sorting edge but opposite to the direction in which the sorting bars 53 were previously moved to effect the initial separation of the desired and undesired cards. Alternatively, further separation of the desired cards can be effected by moving the lock bar in the direction the sorting bars were initially moved.

As those skilled in the art will appreciate, the setting of the shorting bars may be effected in a number of ways other than in the manner disclosed. For example, instead of providing notches 55A, 55B and 55C for cooperation with rods 59A, 69B and 59C which permit elevation of the code bars 53 by lateral displacement thereof, it is possible to provide means for directly elevating the code bars 53 which directly apply an upward force to the code bars 53, the code bars not being displaced laterally in the process of being set or reset.

Figure 26:
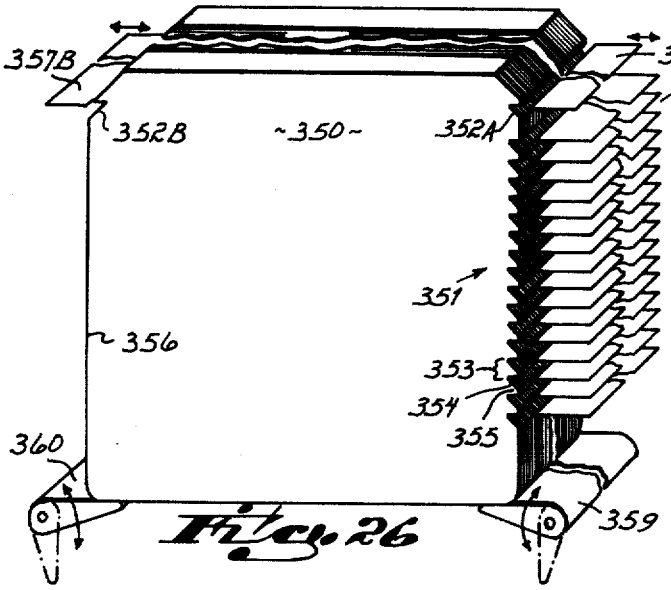
FIGURE 26 is a further modification of the article storing and sorting apparatus of this invention in which gravity is used to relatively move the articles and in which separate article support means are necessary.

While the preferred embodiment of the invention has been described with respect to selection of cards using magnetic force to produce the relative displacement necessary to effect the initial and further separation between selected and unselected cards, the invention need not be limited to the selection of cards and/or the use of magnetic force to effect relative motion between selected and unselected articles. Referring to FIGURE 26, an embodiment is shown suitable for storing a plurality of articles, such as cartridges 350, containing items, for example, reels of microfilm. The cartridges 350 are each provided with a vertically disposed sorting edge 351 having a lock notch 352A and a plurality of adjacent code sites 353 each having a registration notch 354 and a selectively removable tooth 355. A second lock notch 352B is provided in the left vertical edge 356 in a position substantially opposite the lock notch 352A. Cooperating with the lock notches 352A and 352B are a pair of selectively horizontally shiftable lock bars 357A and 357B, respectively. Cooperating with the plurality of code sites 353 are a like numbered and positioned plurality of code bars 358. The code bars 358 and lock bars 357 are selectievly shiftable between outward reset positions shown in FIGURE 26 and inward set positions. Supporting the plurality of cartridges 350 are a pair of selectively pivotal arms 359 and 360 adapted to move from the solid line position shown in FIGURE 26, wherein the cartridges 350 are supported, to the dotted line position shown in FIGURE 26, wherein the cartridges 350 are free to fall downward under the force of gravity.

In operation, selection of one or more of the cartridges 350 from a plurality of similarly aligned cartridges is effected by first setting one or more of the code bars 358, that is, by moving one or more of the code bars leftwardly into their associated registration notches formed in the cartridges 350, such that the pattern of set sorting bars 358 corresponds to the notch pattern of the desired cartridge 350. Having set the sorting bars 358, and with the lock bars 357A and 357B reset to the position shown in FIGURE 24, the arms 359 and 360 are pivoted from the solid line position to the dotted line position. This enables the cartridge 350 having a notch pattern conforming to the pattern of actuated code bars 356 to drop a distance equal to the width of one tooth 355, thereby effecting initial or partial separation of the selected [cards] *cartridges* from the unselected [cards] *cartridges*. The unselected cartridges are prevented from falling by the set code bars 358. Following this step, the lock bars 357A and 357B are actuated, that is, the lock bars 357A and 357B are engaged with the lock notches 352A and 352B of the unselected cartridges 350 which have remained stationary. Thereafter, the set code bars 358 are reset or returned to the position shown in FIGURE 26 to effect further separation of the desired cartridges. Upon the return of the code bars 358 to their normal reset position, the selected and partially separated cartridges fall under the force of gravity to a suitably positioned bin or receptacle placed beneath the cartridges. The unselected cartridges remain in their normal stored position under the action of the lock bars 357A and 357B which are engaged with the lock notches 352A and 352B, respectively.

Figure 25:
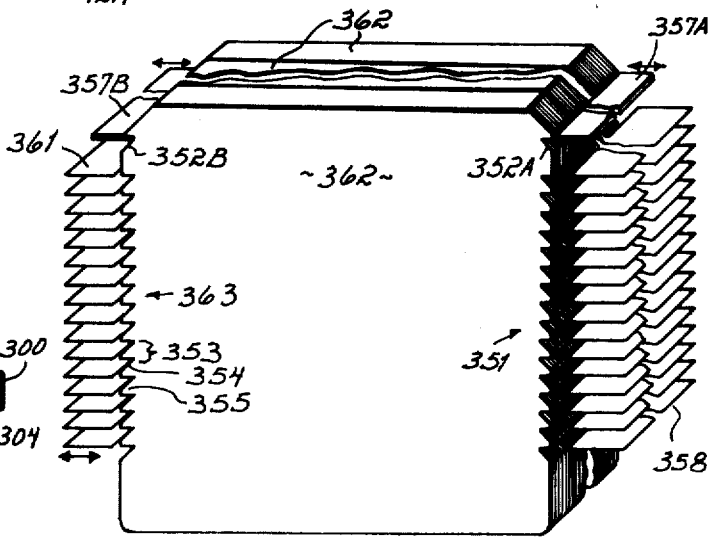
FIGURE 25 is a modification of the article storing and sorting apparatus of this invention in which gravity is used to relatively move the articles and in which separate and independent card support means are unnecessary.

If desired, the support arms 359 and 360 provided in the embodiment of FIGURE 24 may be eliminated as depicted in the embodiment of FIGURE 25. The embodiment of this figure is seen to include, in addition to the pair of opposed lock bars 357A and 357B and the set of code bars 358, a second set of code bars 361. The second set of code bars 361 are identical in structure and operation to the code bars 358, except that instead of cooperating with a sorting edge 351 positioned on the right-hand portion of the cartridge 362, they cooperate with a sorting edge 363 positioned on the left-hand side of the cartridge.

In operation, the cartridges 362 are aligned and initially supported by the lock bars 357A and 357B. Thereafter the appropriate code bars 358 and 361 are set or moved inwardly engaging their associated registration notches of sorting edges 351 and 363, respectively. With the coding bars of both sets 358 and 361 set, the initial separation of the desired cards from the undesired cards is effected by resetting the lock bars 357A and 357B. This is accomplished by moving the lock bars outwardly, disengaging the lock bars 357A and 357B from their respective lock notches 352A and 352B. Upon disengagement of the lock bars 357A and 357B from their associated lock notches, 352A and 352B, the cartridges 362 having a pattern of notches in their respective sorting edges 351 and 363 corresponding to the pattern of the actuated coding bars 358 and 361 fall downwardly under the force of gravity a distance equivalent to the width of one of the teeth, thereby completing partial separation of the selected cartridges from the unselected cartridges.

Further separation of the selected cartridges from the unselected cartridges is effected by engaging the lock bars 357A and 357B with the now exposed lock notches 352A and 352B of the unselected cartridges having sorting edges nonconforming to the pattern of the actuated code bars. At this point, the unselected cartridges are supported by both the lock bars 357A and 357B, and the actuated code bars 358 and 361 while the selected cartridges are supported by only the actuated code bars. With the lock bars 357A and 357B set, the actuated code bars are reset. This is effective to release the partially separated cartridges allowing them to fall further downwardly under the force of gravity into a suitably positioned receptacle or bin. This completes the further separation phase of the sorting cycle. The unselected cartridges remain stationary due to the locking action of the engaged lock bars 357A and 357B.

Thus, the embodiment of FIGURE 25, by providing an additional set of code bars 361 is capable of eliminating the need for the support arms 359 and 360, the support function being accomplished by the cooperating coding bars 358 and 361.

Thus, the embodiments of FIGURES 25 and 26 demonstrate the principles of this invention apply to articles other than cards, and for example, apply to cartridges suitable for storing reels of microfilm, etc. Further, the embodiments of FIGURES 25 and 26 demonstrate that the principles of this invention apply to card separating means other than magnetic attraction, and include, for example, such card separating means as gravity. In addition to cards and cartridges, the invention contemplates sorting other articles such as ledger sheets, envelopes, folders and the like, as well as separating articles by other means such as vibration, air jets, etc. or a combination thereof.

From the above disclosure of the general principles of the present invention and the detailed description of a preferred embodiment, as well as various modifications thereof, those skilled in the art will readily comprehend further modifications to which the invention is susceptible.

Having described my invention, I claim:

1. Apparatus for selecting articles having a sorting edge with alternate registration notches and code notchable teeth from a plurality of different articles supported with their respective sorting edges *substantially horizontal and* aligned, said apparatus comprising:

a plurality of sorting bars disposed *in a substantially horizontal plane and* transversely of said sorting edges adjacent said registration notches, a sorting bar actuator for selectively moving said sorting bars *vertically* into different ones of said registration notches of said articles, article separating means, *including article-mounted magnetically responsive portions and a magnet which are movable relative to each other in a substantially horizontal direction*, for producing relative limited displacement in a *substantially horizontal* direction parallel to said sorting edge between articles notched in conformity with the pattern of actuated sorting bars and articles not conformingly notched, thereby partially separating said conformingly and nonconformingly notched articles, and article locking means selectively engageable with one or the other of said partially separated articles for enabling further separation of said conformingly and nonconformingly notched articles by continued *horizontal* relative displacement in said parallel direction.

2. The apparatus of claim 1 wherein said article locking means engages and restrains movement of said nonconforming articles for enabling further separation of said conforming and nonconforming articles by displacement of said conforming articles in said parallel direction by said article separating means.

3. The apparatus of claim 1 wherein said article locking means includes a barrier insertable between portions of said partially separated articles for enabling further separation of said conforming and nonconforming articles by continued relative displacement in said parallel direction.

4. The apparatus of claim 3 wherein said article separating means displaces said conformingly notched articles during said partial separation and said final separation, and wherein said actuated sorting bars and said barrier restrains movement of said nonconformingly notched articles during said partial separation and said further separation, respectively.

5. An apparatus for selecting articles having a sorting edge with a code region in which are formed alternate registration notches and code notchable teeth and a locking region in which are formed a lock notch and a relieved portion from a plurality of different articles supporting with their sorting edges *substantially horizontal and* aligned, said apparatus comprising:

a plurality of sorting bars and a locking bar disposed *in a substantially horizontal plane* and transversely of said sorting edge adjacent said registration notches and said lock notches, respectively, a sorting bar actuator for selectively moving said sorting bars *vertically* into different ones of said registration notches of said articles, article separating means, *including article-mounted magnetically responsive portions and a magnet which are movable relative to each other in a substantially horizontal direction*, for producing relative limited displacement between articles notched in conformity with the pattern of actuated sorting bars and articles not conformingly notched, thereby partially separating said conformingly and nonconformingly notched articles, said relative limited displacement being in a *substantially horizontal* direction parallel to said sorting edge and for a distance sufficient to align the lock notches of one of said conformingly and nonconformingly notched articles and the relieved portions of the other of said conformingly and nonconformingly notched articles, and a lock bar actuator for moving said lock bar *vertically* into said aligned lock notches for enabling further separation of said conformingly and nonconformingly notched articles upon removal of said selectively moved sorting bars by continued *horizontal* relative displacement in said parallel direction.

6. The apparatus of claim 5 wherein said partial separation aligns the lock notches of said nonconformingly notched articles and the relieved portions of said conformingly notched articles, and wherein said lock bar moves into the lock notches of said nonconformingly notched articles intermediate said partial and further separation of said articles.

7. The apparatus of claim 6 wherein said article separating means displaces said conformingly notched articles during said partial separation and said final separation and wherein said actuated sorting bars and said lock bar restrain movement of said nonconformingly notched articles during said partial separation and said further separation, respectively.

8. The apparatus of claim 5 wherein said article separating means includes a magnet *which is elongated and* disposed *substantially horizontally and* transversely of said articles adjacent *said* magnetically responsive portions thereof for applying a force to said articles in a *substantially horizontal* direction parallel to said sorting edge.

9. An apparatus for selecting articles having a sorting edge with alternate registration notches and code notchable teeth from a plurality of different articles supported with their respective sorting edge *substantially horizontal and* aligned, each of said articles having a magnetically responsive portion thereon, the improvement which comprises:

*a planar support disposed in a substantially horizontal plane and contacting the bottom edge of said articles for supporting said articles with their sorting edges horizontal,* a plurality of sorting bars disposed *in a substantially horizontal plane and* transversely of of said sorting edges adjacent said registration notches, a sorting bar actuator for selectively moving said sorting bars *vertically* into different ones of said registration notches of said articles, a magnet disposed *substantially horizontally* adjacent said magnetically responsive portions of said articles for attracting said articles, means for relatively limitedly displacing said magnet and said sorting bars *in a substantially horizontal direction* to partially separate articles having their respective teeth notched in conformity with the pattern of actuated sorting bars from articles not conformingly notched, said relative displacement being in a *substantially horizontal* direction parallel to said sorting edges, and a barrier insertable between portions of said partially separated articles for enabling further separation of said conforming and nonconforming articles by continued relative displacement in said parallel direction.

10. The apparatus of claim 9 wherein said barrier is a lock member disposed transversely of said sorting edges for engaging lock elements formed in the sorting edge of said partially separated noncomformingly notched article, and wherein said partial displacement of said magnet and sorting bars is for a distance sufficient to produce alignment between said lock member and the lock elements of only said nonconforming articles.

11. The apparatus of claim 9 wherein said barrier is a lock bar disposed transversely of said sorting edges for engaging lock notches formed in the sorting edges of said partially separated nonconformingly notched articles, and wherein said partial displacement of said magnet and sorting bars is for a distance sufficient to produce alignment between said lock bar and the lock notches of only said nonconforming articles.

12. The apparatus of claim 11 wherein said magnet is displaced *substantially horizontally* to produce said partial article separation.

13. The apparatus of claim 12 wherein said distance said magnet is partially displaced is substantially equal to the width of a code notchable tooth measured along the sorting edge, and wherein said lock notches are located such that the lock notches of nonconformingly notched articles clear the adjacent ends of partially displaced conformingly notched articles.

14. The apparatus of claim 13 wherein said articles are supported face-to-face with their sorting edges lowermost, *and in contact with said planar support,* wherein said sorting and lock bars are selectively raised to engage said registration and lock notches, respectively, and wherein said magnet is shifted laterally to effect article separation.

15. An apparatus for selecting articles having *a magnetically attractive element and a* sorting edge with alternate registration notches and code notchable teeth from a plurality of different articles supported with their respective sorting edges *substantially horizontal and* aligned, said apparatus comprising:

a support for supporting said articles with said sorting edges aligned *and substantially horizontal,* a plurality of sorting bars disposed *in a substantially horizontal plane and* transversely of said sorting edge adjacent said registration notches, locking means for selectively restraining cards from movement parallel to their sorting edges,

*magnetic* force means for applying a *magnetic* force on said articles in a direction tending to move said articles *substantially horizontally and* parallel to said sorting edge, and control means for sequentially inserting selected ones of said sorting bars *vertically* into different ones of said registration notches, actuating said force means to partially separate articles notched in conformity to said pattern of selectively moved sorting bars and articles not conformingly notched, and actuating said locking means to restrain movement of said non-conformingly notched articles and removing said inserted sorting bars from said different ones of said registration notches for enabling further separation of said conforming and nonconforming articles by continued relative movement in said parallel direction.

16. An article for use in an automatic retrieval system, said article being of generally quadrangular configuration and including *a magnetically responsive element mounted thereto,* a sorting edge having alternately spaced registration notches and code notchable teeth, a lock notch engageable with a lock bar to restrain movement in a direction parallel to said sorting edge, and a relieved portion spaced from said *lock* notch a distance substantially equal to the width of a code notchable tooth, whereby said relieved portion is adapted to become aligned with the lock notch of a superposed adjacent article when moved relative thereto the width of a tooth in said parallel direction *by application of a magnetic attractive force to said element.*

17. The article of claim 16 [further including] *wherein said element is* a ferromagnetic element carried by said article along an edge adjacent said sorting edge and wherein said pairs of alternately spaced registration notches and code notchable teeth are located intermediate said lock notch and said ferromagnetic element-bearing article edge.

18. The article of claim 17 wherein said relieved portion of said sorting edge lies between said edge opposite said ferromagnetic element-bearing edge and said locking notch.

19. The article of claim 18 further including a first positioning notch located in said ferromagnetic element bearing edge, said first positioning notch being configured to urge said sorting edge against a card support when engaged with a first positioning cam member.

20. The article of claim 19 further including a second positioning notch located in the card edge opposite said first positioning notch, said second positioning notch being configured to urge said sorting edge against said card support when engaged with a second positioning cam member.

21. The article of claim 16 wherein the width of said registration notches measured at the sorting edge exceeds the width of said registration notches measured at a point displaced from said sorting edge, thereby enabling misaligned articles to shift in a direction parallel to said sorting edge and become aligned when a transversely disposed bar common to said articles is inserted into similarly positioned registration notches of each article.

22. An apparatus for selecting articles having *a magnetic element and* a sorting edge with alternate registration notches and code notchable teeth and a lock notch and adjacent relieved portion from a plurality of different articles supported with their respective sorting edges *substantially horizontal and* aligned, said apparatus comprising:

a *planar* support *disposed in the horizontal plane and contacting the bottom edge of said articles* for supporting said articles with said sorting edges aligned *in a substantially horizontal plane,* a plurality of sorting bars and a locking bar disposed *in a substantially horizontal plane* transversely of said sorting edge adjacent said registration notches and said lock notches, respectively,

*magnetic* force means for applying a *magnetic* force on said articles in a direction tending to move said articles parallel to said sorting edge *in a substantially horizontal direction,* and control means for sequentially inserting selected ones of said sorting bars *vertically* into different ones of said registration notches, actuating said force means to separate articles notched in conformity to said pattern of selectively moved sorting bars and articles not conformingly notched a distance sufficient to align the lock notches of one of said conformingly and nonconformingly notched articles and the relieved portions of the other of said conformingly and nonconformingly notched articles, and inserting said lock bar into said lock notches and removing said inserted sorting bars from said different ones of said registration notches for enabling further separation of said conforming and nonconforming articles by continued relative movement in said parallel direction.

23. An apparatus for selecting articles having a sorting edge with alternate registration notches and code notchable teeth from a plurality of different articles, the improvement comprising:

a planar support *disposed in a horizontal plane and* contactable with the sorting edges of said articles for supporting said articles with said sorting edges aligned *and horizontal,* a first cam positioner engageable with a positioning notch formed in an edge of said article adjacent said sorting edge for urging said article sorting edge against said planar support, a plurality of sorting bars disposed *in a horizontal plane* transversely of said sorting edges adjacent said registration notches, a sorting bar actuator for selectively moving said sorting bars *vertically* into different ones of said registration notches of said articles, an article separator, *including article-mounted magnetically responsive elements and a magnet which are movable relative to each other in a substantially horizontal direction,* for producing relative and limited *horizontal* displacement and thereby partial separation between articles having a notch pattern conforming to said actuated sorting bars and articles having a nonconforming notch pattern, said displacement being in a *horizontal* direction parallel to said sorting edges and for a distance substantially equal to the dimension of a code notchable tooth measured along said sorting edge, and a barrier insertable *vertically* between portions of said partially separated articles for enabling said separator to further separate said conforming and nonconforming articles by continued relative displacement of said articles in said parallel direction.

24. The apparatus of claim 23 further including a second cam positioner engageable with the edge of said articles opposite said sorting edge for further urging said article sorting edges against said planar support.

25. The apparatus of claim 24 wherein said first cam positioner is movable in a *horizontal* direction parallel to said planar support for moving said articles in said *horizontal* direction into alignment with each other and said opposite article edges into engagement with said second cam positioner.

26. An apparatus for selecting articles having a sorting edge with alternate registration notches and code notchable teeth from a plurality of different articles *disposed with their sorting edges aligned in a substantially horizontal plane,* the improvement comprising:

a planar support *disposed in a horizontal plane and* contactable with the sorting edges of said articles for supporting said articles with said sorting edges aligned, a plurality of sorting bars disposed *in a horizontal plane* transversely of said sorting edges adjacent said registration notches, a sorting bar actuator for selectively moving said sorting bars *vertically* into different ones of said registration notches of said articles, an article separator, *including article-mounted magnetically responsive elements and a magnet which are movable relative to each other in a substantially horizontal direction,* for producing relative and thereby partial separation between articles having a notch pattern conforming to said actuated sorting bars and articles having a nonconforming notch pattern, said displacement being in a direction parallel to said sorting edges and for a *horizontal* distance substantially equal to the dimensions of a code notchable tooth measured along said sorting edge, a barrier insertable *vertically* between portions of said partially separated articles for enabling said separator to further separate said conforming and nonconforming articles by continued relative displacement of said articles in said parallel direction, and a cam positioner engageable with the edge of said articles opposite said sorting edge for urging said article sorting edges into contact with said planar support as said articles are moved in the direction of said sorting edge to a position in which their registration notches are aligned with said sorting bars and for maintaining said sorting edges in said contacting condition during article separation.

27. The apparatus of claim 3 wherein said barrier comprises a lock bar transversely disposed to said sorting edge and wherein said articles include a lock notch formed in one of said sorting edges and the opposite edge, said lock bar being selectively engageable with the lock notches of said nonconformingly notched articles to restrain motion of said nonconformingly notched articles as said conformingly notched articles are further separated.

28. The apparatus of claim 8 wherein said magnet displaces said conformingly notched articles during said partial separation and said final separation and wherein said actuated sorting bars and said lock bar restrain movement of said nonconformingly notched articles during said partial separation and said further separation, respectively.

29. A method of sorting edge-notched articles having *a magnetically attractive element and* a predetermined notch pattern along a sorting edge from articles having different notch patterns, said method comprising the steps of:

disposing said articles *vertically* in a position with the sorting edges of said articles in alignment *in a substantially horizontal plane,* selectively partially separating articles having the predetermined notch pattern from articles not having the predetermined notch patterns by *applying a horizontally directed magnetically attractive force to said*

*elements to* limitedly relatively [shifting] *shift* said first and last mentioned articles in a *horizontal* direction parallel to said sorting edges, interposing a barrier between portions of said partially separated articles to prevent movement of one of said first and last mentioned articles when said other of said articles is moved, and further *applying a horizontally directed magnetically attractive force to said elements for* relatively displacing said first and last mentioned articles in said *horizontal* parallel direction to effect further separation of said partially separated articles.

30. A method of sorting edge notched articles having a predetermined notch pattern along a sorting edge from articles having different notch patterns, said method comprising the steps of:

disposing said articles *vertically* in a position with the *sorting* edges of said articles in alignment *in a horizontal plane,* selectively engaging sorting bars conforming to said predetermined pattern with said sorting edges of said articles, partially separating articles having the predetermined notch pattern from articles not having the predetermined notch pattern by limitedly relatively displacing a magnet engaged with ferromagnetic chips attached to said articles and said sorting bars in a *horizontal* direction parallel to said sorting edge, disengaging said sorting bars and said sorting edges, interposing a barrier between portions of said partially separated articles to prevent movement of one of said [first and last mentioned] *predetermined and nonpredetermined notch pattern* articles when said other of said articles is moved, and further separating said [first and last mentioned] *predetermined and nonpredetermined notch pattern* articles by relatively displacing said magnet and said barrier member in said parallel *horizontal* direction.

31. The method of claim 30 wherein said barrier is a lock bar common to and transversely disposed of said sorting edges for engagement with lock notches formed in the sorting edges of said articles, and wherein said partial separating step includes limitedly horizontal displacing said magnet a distance sufficient to align said lock bar and the lock notches of only the nondisplaced articles, and wherein said further separating step includes displacing said magnet *horizontally* for withdrawing the partially displaced articles having the predetermined notch pattern from the articles restrained against motion by the engagement of their respective lock notches with said lock bar.

32. Apparatus for relatively moving a support having a plurality of aligned cards positioned thereon and a magnet disposed transversely of said cards in magnetically attractive relationship to ferromagnetic chips formed thereon, said apparatus comprising:

a cam rotatably mounted on one of said support and magnet, said cam having a pair of oppositely disposed lobes, and a pair of bell cranks each pivotally mounted on said one of said support and magnet adjacent opposite sides of said cam, said bell cranks each having (a) a cam follower arm engageable with opposite portions of said cam for pivoting said bell cranks when said lobes of the rotating cam contact said follower arms, and (b) a pushing arm engageable with the other of said support and magnet for relatively moving said support and magnet when said bell crank undergoes said pivotal motion.

33. The apparatus of claim 32 wherein said bell cranks and said cam lobes are dimensioned and positioned relative to each other such that said pivotal bell crank motion exerts equal forces on said other of said support and magnet.

34. The apparatus of claim 33 wherein said cam and bell cranks are rotatably and pivotally mounted, respectively, on said support, said pushing arms are engageable with said magnet, and said bell cranks are identically configured and symmetrically arranged about said cam.

35. An article of manufacture adapted for mechanized retrieval comprising:

a substantially quadrangular card having a notch with a sinuously configured edge portion formed along the margin thereof, a ferromagnetic chip located in said notch and having an edge approximately similarly configured to said sinuously configured notch edge for forming a sinuous joint between said chip and card which is resistant to bending-induced failure.

36. The article of manufacture of claim 35 wherein said substantially similarly configured notch and chip edges contact at said sinuous joint in at least two distinct points.

37. The article of manufacture of claim 36 wherein said notch is formed at a corner of said card adjacent a sorting edge having a lock notch and having alternate registration notches and notchable teeth located between said lock notch and said chip.

[38. A selection system comprising:

a plurality of articles each having a sorting edge with alternate registration notches and code notchable teeth and with a lock notch, said articles being disposed for movement under the force of gravity in a direction parallel to said sorting edges, a plurality of sorting bars disposed transversely of said sorting edges adjacent said registration notches, said sorting bars being selectively moveable between set and reset positions into and out of engagement with said registration notches, respectively, a lock bar disposed transversely of said sorting edges adjacent said lock notches, said lock bar being selectively moveable between set and reset positions into and out of engagement with said lock notches, respectively, and sequentially operative means for (a) setting selected ones of said sorting bars in a pattern conforming to the pattern of notched teeth of an article to be selected, (b) resetting said lock bar to enable article having notch patterns conforming to said pattern of set sorting bars to be partially separated and displaced in said parallel direction by the force of gravity a distance equal to the width of one of said teeth, thereby exposing the lock notches of the unselected articles, and (c) setting and resetting said lock bar and sorting bars, respectively, to restrain nonconformingly notched articles and permit said selected articles to become further displaced and separated under the force of gravity in said parallel direction, respectively.]

[39. A selection system comprising:

a plurality of articles each having a sorting edge with alternate registration notches and code notchable teeth and with a lock notch, a support for supporting said articles for movement under the force of gravty in a direction parallel to said sorting edges, said support having operative and inoperative conditions for selectively supporting and releasing said articles, respectively, a plurality of sorting bars disposed transversely of said sorting edges adjacent said registration notches, said sorting bars being selectively moveable between set and reset positions into and out of engagement with said registration notches, respectively, a lock bar disposed transversely of said sorting edges adjacent said lock noches, said lock bar being selectively moveable between set and reset positions into and out of engagement with said lock notches, respectively, and sequentially operative means for (a) setting selected ones of said sorting bars in a pattern conforming to the pattern of notched teeth of an article to be selected, (b) releasing said support means to enable articles having notch patterns conforming to said pattern of set sorting bars to be partially separated and displaced by the force of gravity a distance equal to the width of one of said teeth in said parallel direction, thereby exposing the lock notches of the unselected articles, and (c) setting and resetting said lock bar and sorting bars, respectively, to restrain nonconformingly notched articles and permit said selected articles to become further displaced and separated under the force of gravity in said parallel direction, respectively.]

40. The apparatus of claim 1 wherein said sorting bars each have a cam follower surface remote from said aligned sorting edges which cooperates wtih a stationary cam to drive said sorting bar into and out of engagement with its associated registration notch in response to opposed forces applied to the ends of said sorting bar in a direction parallel thereto.

41. The method of claim 29 further including the step of applying to said articles during said partial separating step a force having a component directed from the article edge opposite said sorting edge toward said sorting edge.

42. The method of claim 30 further including the step of applying to said articles during said partial separation step a force having a component tending to move said sorting edges of said articles toward said sorting bars.

43. A selection system comprising:

a plurality of articles having *a magnetically attractive element mounted thereto,* a sorting edge with alternate registration notches and code notchable teeth, and with a lock notch, said articles being *vertically* disposed with their sorting edges aligned *in a substantially horizontal plane,* a plurality of sorting bars and a lock bar disposed *in a horizontal plane* transversely of said sorting edge adjacent said registration notches and said lock notches, respectively, a sorting bar actuator for selectively *vertically* moving said sorting bars into different ones of said registration notches of said articles, article separating means, *including article-mounted magnetically responsive elements and a magnet which are movable relative to each other in a substantially horizontal direction,* for producing relative limited displacement between articles notched in conformity with the pattern of actuated sorting bars and articles not conformingly notched, thereby partially separating said conformingly and nonconformingly notched articles, said relative limited displacement being in a *horizontal* direction parallel to said sorting edge and for a distance sufficient to expose the lock notches of one or the other of said articles conformingly and nonconformingly notched, and a lock bar actuator for moving said locking bar into said exposed lock notches for enabling further separation of said conformingly and nonconformingly notched articles by continued relative displacement in said parallel direction.

44. A selection system comprising:

a plurality of *vertically disposed articles* having a *horizontally* sorting edge with alternate registration notches and code notchable teeth and with a lock notch, said articles further having a magnetically responsive portion thereon, a plurality of sorting bars disposed *in a substantially horizontal plane* transversely of said sorting edges adjacent said registration notches, a sorting bar actuator for selectively moving said sorting bars into different ones of said registration notches of said articles, a magnet disposed adjacent said magnetically responsive portions of said articles for attracting said articles *in a horizontal direction,* means for relatively limitedly displacing said magnet and said sorting bars to partially separate articles having their respective teeth notched in conformity with the pattern of actuated sorting bars from articles not conformingly notched, said relative displacement being in a horizontal direction parallel to said sorting edges, and a barrier insertable between portions of said partially separated articles for enabling further separation of said conforming and nonconforming articles by continued relative displacement in said parallel direction.

[45. A method of selecting articles having a sorting edge with alternate registration notches and code notchable teeth and with a lock notch, said method comprising the steps of:

supporting said articles with their sorting edges substantially vertical, selectively engaging sorting bars conforming to the notched tooth pattern of the article to be selected with the registration notches of said articles, releasing said articles to enable articles having notched tooth patterns conforming to the pattern of said selectively engaged sorting bars to be partially separated and displaced in said vertical direction by the force of gravity, thereby exposing said lock notches of the unselected articles, engaging a lock bar with said exposed lock notches to restrain said nonconformingly notched articles, and disengaging said engaged sorting bars to permit said selected articles to become further displaced and separated in said vertical direction under the force of gravity.]

[46. The method of claim 45 wherein said supporting step includes setting an article support in an article sup- of said articles, and wherein said releasing step includes disengaging said engaged lock bars.]

[47. The method of claim 45 wherein said supporting step includes setting an article uspport in an article supporting conditions, and wherein said releasing step includes resetting said article support in an article release condition.]

[48. The method of claim 47 wherein the setting and resetting of said article support in an article supporting and release condition, respectively, include moving a moveable article support into and out of a support position relative to the article, respectively.]

49. A method of sorting edge notched articles having a magnetically attractive portion and a predetermined notch pattern along a sorting edge from articles having different notch patterns, said method comprising the steps of:

disposing said articles vertically with the sorting edges of said articles in alignment in a substantially horizontal plane, selectively engaging sorting bars conforming to said predetermined pattern with said sorting edges of said articles, applying a magnetic attractive force to said magnetically attractive card portion to limitedly relatively displace in a direction parallel to said sorting edge articles having the predetermined notch pattern and articles not having the predetermined notch pattern, thereby partially separating said articles, disengaging *all* said sorting bars and said sorting edges, and restraining *against movement in said parallel direction* one or the other of said relatively displaced and partially separated articles *after said sorting bars and sorting edge have been disengaged,* and *thereafter* further separating said partially separated articles

*while said sorting bars remain disengaged from said sorting edges and while said one or other of said relatively displaced and partially separated articles remain restrained against movement in said parallel direction.*

50. The method of claim 49 wherein the further separation step includes displacing the other of said partially separated articles in said parallel direction.

51. The method of claim 49 further including the step of restraining said articles against movement in a direction away from said sorting bars during said partial separation.

52. A selection system comprising:

a plurality of articles having a *magnetically attractive portion and* a sorting edge with alternate registration notches and code notchable teeth and a lock member by means of which the card can be selectively restrained from movement in a direction parallel to the sorting edge, *said articles being disposed vertically with their sorting edges horizontal and aligned,* a plurality of sorting bars disposed in a *substantially horizontal plane and* transversely of sorting edges adjacent said registration notches, a sorting bar actuator for selectively moving said sorting bars into different ones of said registration notches of said articles, article separating means, *including a magnet,* for producing relative limited displacement in a *horizontal* direction parallel to said sorting edge between articles notched in conformity with the pattern of actuated sorting bars and articles not conformingly notched, thereby partially separating said conformingly and nonformingly notched articles, and article locking means selectively engageable with the lock members of one or the other of said partially separated articles for enabling further separation of said conformingly and nonconformingly notched articles by continued relative displacement in said *horizontal* parallel direction.

*53. An article for use in an automatic retrieval system, said article being of generally quadrangular configuration and including first and second opposite edges and a sorting edge located therebetween, said first edge having a notch therein, said sorting edge having alternately spaced registration notches and code-notchable teeth, said sorting edge also having a lock notch disposed between said second edge and said alternately spaced registration notches and code-notchable teeth, and a magnetically attractive element fixedly located in said notch formed in said first edge of said article, said element having a notch formed in an edge thereof which is engageable with a bar to facilitate proper positioning movement of said card.*

*54. The apparatus of claim 26 wherein said cam positioner includes a partial cover for the articles stored on said support, said cover being planar and stationarily mounted at a slightly inclined angle to said support to engage said opposite edges and cam said sorting edges toward said sorting bars as said articles slide further onto said support beneath said cover.*

*55. The method of claim 31 wherein said partial and tioner includes a partial cover for the articles stored on further separating steps include displacing said magnet a total distance less than the length of said sorting edge wherein said predetermined and nonpredetermined notch pattern articles are incompletely separated.*

*56. The method of claim 55 further including the step of manually removing, following said further separation step, said predetermined notch pattern article from said incompletely separated articles.*

*57. The method of claim 55 further including the step of returning said magnet to the position it occupied prior to said initial separation step thereby returning said incompletely separated predetermined notch pattern articles to a position on said support in alignment with said nonpredetermined notch pattern articles.*

*58. A selection system comprising:*

*a plurality of vertically disposed articles having a horizontal sorting edge with alternate registration notches and code notchable teeth and with a lock notch, said articles further having a magnetically responsive portion thereon,*

*a plurality of sorting bars disposed in a substantially horizontal plane transversely of said sorting edges adjacent said registration notches,*

*a sorting bar actuator for selectively moving said sorting bars into different ones of said registration notches of said articles,*

*a magnet disposed adjacent said magnetically responsive portions of said articles for attracting said articles in a horizontal direction,*

*means for initially relatively limitedly displacing said magnet and said sorting bars to partially separate articles having their respective teeth notched in conformity with the pattern of actuated sorting bars from articles not conformingly notched, said relative displacement being in a horizontal direction parallel to said sorting edges, and*

*a barrier insertable between portions of said partially separated articles for enabling further separation of said conforming and nonconforming articles by continued relative displacement in said parallel direction,*

*means for further displacing said magnet and said sorting bars to further separate articles having their respective teeth notched in conformity with the pattern of actuated sorting bars from articles not conformingly notched, said relative displacement being in a horizontal direction parallel to said sorting edges,*

*said means for initially and further displacing said articles providing a total displacement between said conformingly and nonconformingly notched articles which is less than the length of said sorting edge, thereby facilitating return of said conformingly notched articles to said nonconformingly notched articles by reverse movement of said magnet in a direction toward said sorting bars, and*

*means permitting movement of said magnet in a reverse direction toward said sorting bars to return said conformingly notched articles to said nonconformingly notched articles.*

References Cited

The following references, cited by the Examiner, are of record in the patented file of this patent or the original patent.

UNITED STATES PATENTS

| | | | |
|---|---|---|---|
| 3,396,732 | 8/1968 | Morse et al. | 209—110.5 |
| 3,450,261 | 6/1969 | Kalthoff et al. | 209—111.8 |
| 3,199,674 | 8/1965 | Kalthoff et al. | 209—80.5 |
| 3,266,497 | 8/1966 | Bleiman | 209—80.5 |
| 3,394,247 | 7/1968 | Irasek | 209—80.5 X |

FOREIGN PATENTS

| | | | |
|---|---|---|---|
| 815,970 | 10/1958 | Great Britain | 209—80.5 |

ALLEN N. KNOWLES, Primary Examiner

U.S. Cl. X.R.

235—61.12 M

UNITED STATES PATENT OFFICE

CERTIFICATE OF CORRECTION

Patent No. Reissue 27,762 Dated September 18, 1973

Inventor(s) Robert D. Parry

It is certified that error appears in the above-identified patent and that said Letters Patent are hereby corrected as shown below:

Column 29, line 29, (Claim 9), delete "of" second occurrence. Column 32, line 28, after "and" insert -- limited displacement and --. Column 37, line 62, (Claim 55), delete "tioner includes a partial cover for the articles stored on".

Signed and sealed this 26th day of March 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.